(12) United States Patent
Wijaya et al.

(10) Patent No.: US 11,128,624 B2
(45) Date of Patent: Sep. 21, 2021

(54) SYSTEMS, METHODS, AND APPARATUSES FOR LOGGING IN TO AN EXTERNAL WEBSITE FROM A CLOUD BASED COMPUTING ENVIRONMENT

(71) Applicant: salesforce.com, inc., San Francisco, CA (US)

(72) Inventors: Albert Wijaya, Seattle, WA (US); Benjamin Chu, Emeryville, CA (US); William Charles Mortimore, Jr., San Francisco, CA (US); Ian Glazer, Washington, DC (US); Matthew Bahrenburg, San Francisco, CA (US); Prashanth Mahalingam Ganesan, Seattle, WA (US); Puneet Dhaliwal, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 256 days.

(21) Appl. No.: 16/140,410

(22) Filed: Sep. 24, 2018

(65) Prior Publication Data

US 2020/0099685 A1 Mar. 26, 2020

(51) Int. Cl.
*H04L 29/06* (2006.01)
*G06F 21/45* (2013.01)
*H04L 29/08* (2006.01)
*G06F 21/40* (2013.01)

(52) U.S. Cl.
CPC .......... *H04L 63/0884* (2013.01); *G06F 21/40* (2013.01); *G06F 21/45* (2013.01); *H04L 67/22* (2013.01)

(58) Field of Classification Search
CPC . H04L 63/0884; H04L 67/22; H04L 63/0815; H04L 63/0892; H04L 67/025; H04L 63/08; G06F 21/40; G06F 21/45; G06F 21/41; H04W 12/0804; H04W 12/0806
See application file for complete search history.

(56) References Cited

U.S. PATENT DOCUMENTS

| | | | |
|---|---|---|---|
| 9,990,622 B2 * | 6/2018 | Choi | ................. G06Q 30/0609 |
| 2008/0189186 A1 * | 8/2008 | Choi | ..................... G06Q 20/32 |
| | | | 705/26.35 |
| 2013/0019295 A1 * | 1/2013 | Park | ...................... G06F 21/33 |
| | | | 726/7 |

(Continued)

*Primary Examiner* — Techane Gergiso
(74) *Attorney, Agent, or Firm* — Elliot, Ostrander & Preston, P.C.

(57) ABSTRACT

Systems, methods, and apparatuses for implementing authentication of a user login to an external website from a community in a cloud based computing environment. An exemplary system having at least a processor and a memory therein includes means for identifying a first domain where a user is to be allowed to login to an external web page hosted thereon, and means for connecting the external web page with a community of a cloud computing environment hosted on a second domain different than the identified first domain, the connecting means handling how the connected community authenticates the user when the user logs into the external web page and providing one of a plurality of login experiences for the user based on conditions determined at run time.

36 Claims, 11 Drawing Sheets

(56) References Cited

U.S. PATENT DOCUMENTS

| | | | |
|---|---|---|---|
| 2013/0060889 A1* | 3/2013 | Miyazawa | H04L 63/08 709/217 |
| 2013/0188212 A1* | 7/2013 | Pardhan | H04N 1/00464 358/1.14 |
| 2013/0227658 A1* | 8/2013 | Leicher | H04L 63/0876 726/5 |
| 2014/0082715 A1* | 3/2014 | Grajek | G06F 16/955 726/8 |
| 2015/0089623 A1* | 3/2015 | Sondhi | H04L 63/0815 726/9 |
| 2017/0155658 A1* | 6/2017 | Mullins | G06F 21/33 |
| 2017/0230825 A1* | 8/2017 | Counterman | H04L 63/0876 |
| 2018/0075231 A1* | 3/2018 | Subramanian | G06F 16/86 |
| 2018/0253714 A1* | 9/2018 | Choi | G06Q 20/12 |
| 2019/0213553 A1* | 7/2019 | Ragsdale | H04L 9/3213 |
| 2019/0334911 A1* | 10/2019 | Parthasarathy | G06F 21/6218 |

* cited by examiner

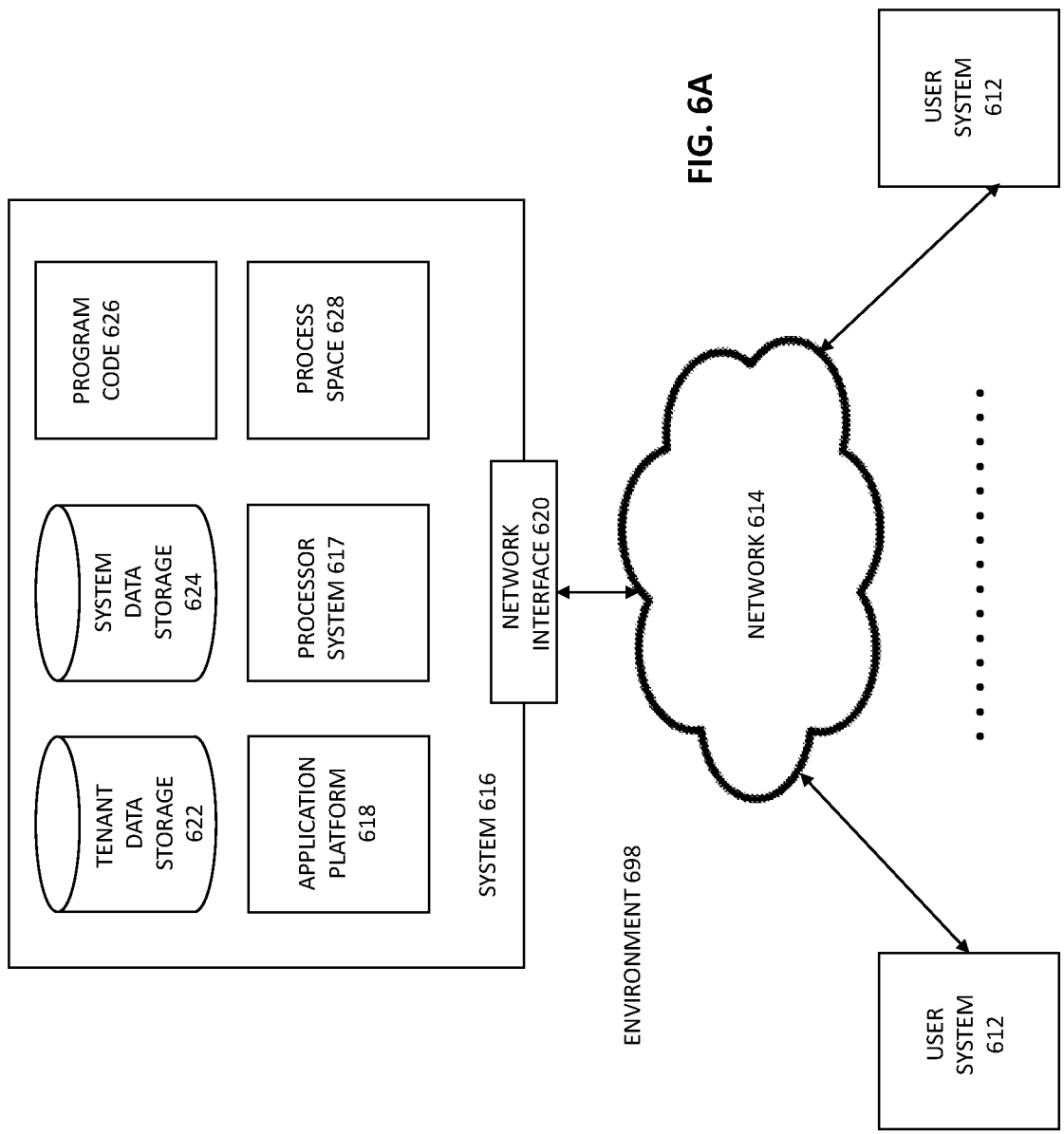

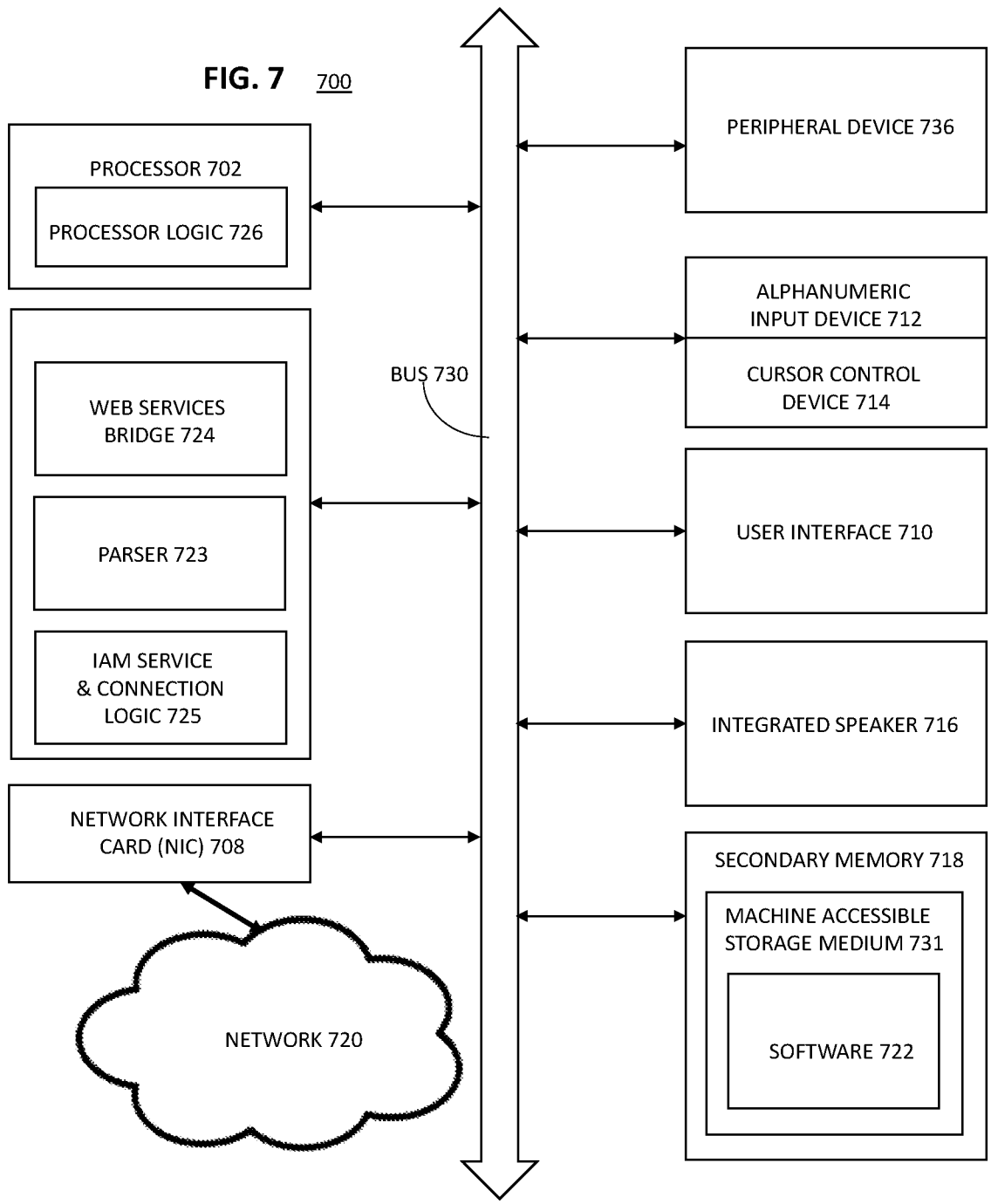

SYSTEMS, METHODS, AND APPARATUSES FOR LOGGING IN TO AN EXTERNAL WEBSITE FROM A CLOUD BASED COMPUTING ENVIRONMENT

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for implementing authentication of, and providing a login experience for, a user logging in to an external website from a community in a cloud based computing environment such as a database system implementation supported by a processor and a memory to execute such functionality. Such means may be implemented within the computing architecture of a hosted computing environment, such as an on-demand or cloud-computing environment that utilizes multi-tenant database technologies, client-server technologies, traditional database technologies, or other computing architecture in support of the hosted computing environment.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

With the proliferation of SaaS and other web-based applications, identity management is becoming a major concern for businesses. Consider the number of usernames and password a person regularly types each day, logging into their company's network, portal, webmail, benefits system, Google Apps, custom applications and cloud based computing environment (e.g., Force.com) applications. Now multiply this by the number of users in a company and consider the support and security implications. An organization needs dedicated resources to manage an identity store, respond to password reset requests, provision new users for each system and deactivate users that no longer need access. Implementing a Single Sign-On (SSO) infrastructure enables users to sign in once and have access to all authorized resources. There are different methods of implementing SSO with a cloud based computing environment, including how to set up an organization's own open source identity management system for federated authentication using Security Assertion Markup Language (SAML) 2, and how to configure the cloud based computing platform to utilize an identity provider.

Many organizations would like to extend identity provider services to external websites and applications. However, these external websites and applications may not have been developed to use SAML or other standard identity management systems and protocols, and rewriting these website and applications to take advantage of such systems and protocols would be time consuming and expensive.

The present state of the art may therefore benefit from the systems, methods, and apparatuses for implementing authentication of, and providing a login experience for, a user logging in to an external website from a community in a cloud based computing environment as described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 6A illustrates a block diagram of an environment in which an on-demand database service may operate in accordance with the described embodiments;

FIG. 7 illustrates a diagrammatic representation of a machine in the exemplary form of a computer system, in accordance with one embodiment.

DETAILED DESCRIPTION

Figure 1:
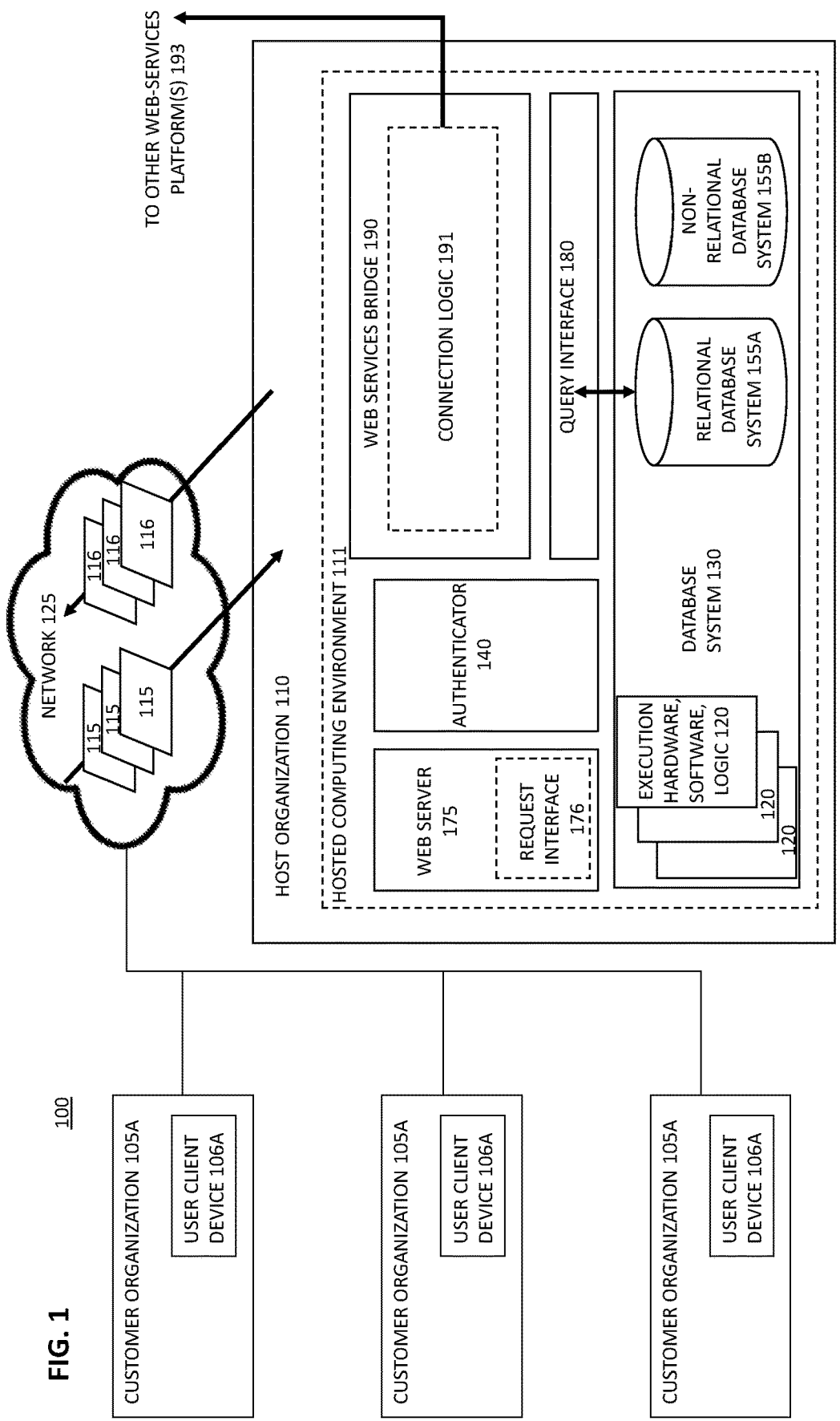
FIG. 1 depicts an exemplary architecture in accordance with described embodiments.

Described herein are systems, methods, and apparatuses for implementing authentication of, and providing a login experience for, a user logging in to an external website from a community in a cloud based computing environment. For instance, such an exemplary system having a processor and a memory therein includes means for identifying a first domain where a user is to be allowed to login to an external web page hosted thereon, and means for connecting the external web page with a community of a cloud computing environment hosted on a second domain different than the identified first domain, the connecting means handling how the connected community authenticates the user when the user logs into the external web page and providing one of a plurality of login experiences for the user based on conditions determined at run time.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

Certain embodiments may utilize a client-server computing architecture to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization.

Still further depicted within the hosted computing environment 111 is the web-services bridge 190 having therein connection logic 191 capable of communicating with web-sites and other web-services platform(s) 193 regardless of whether such websites or web-services platforms are hosted by the same host organizations 110 or hosted by different host organizations.

Figure 3A:
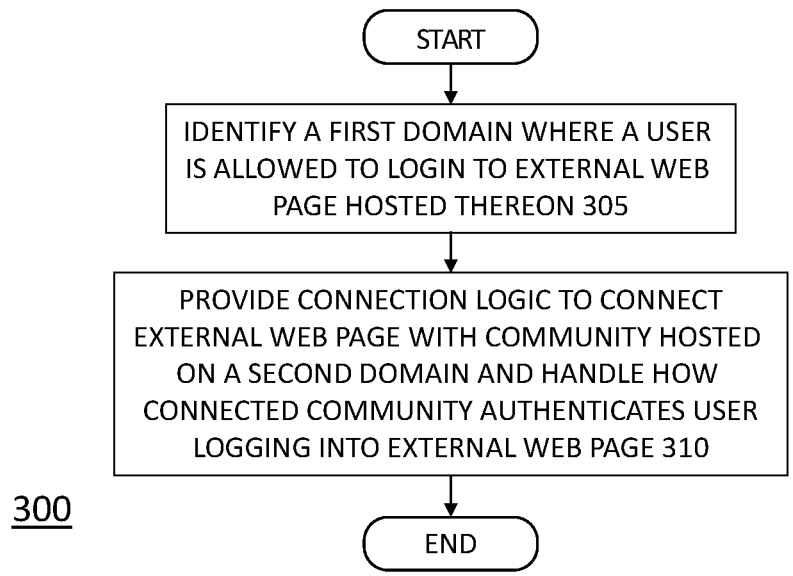
FIG. 3A depicts a flow diagram illustrating a method for implementing authentication of a user login to an external website from a community in a cloud based computing environment in accordance with disclosed embodiments.
Figure 3B:
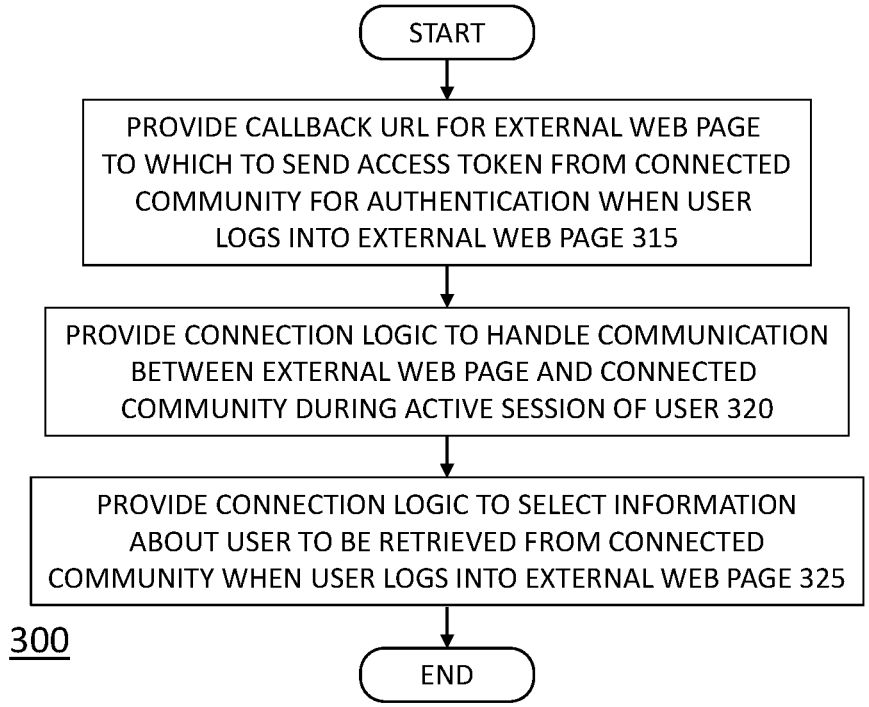
FIG. 3B depicts a flow diagram illustrating a method for implementing authentication of a user login to an external website from a community in a cloud based computing environment in accordance with disclosed embodiments.

FIGS. 3A and 3B depict flow diagrams illustrating a method 300 for implementing authentication of a user login to an external website from a community in a cloud based computing environment in accordance with the disclosed embodiments. Method 300 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, the web-services bridge 190, and its database system 130 as depicted at FIG. 1, and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

Embodiments of the invention take advantage of identity services that connects users to applications. The assignee of the invention provides a service known as Salesforce identity, an Identity and Access Management (IAM) service that connects users to application, services, and devices. An IAM service provides a centralized point of management for cloud computing environment administrators and provides a single, trusted identity for the cloud computing environment's end users. Traditionally, IAM services have focused on employee-facing use cases. Today, companies are using IAM services as a way to better connect with their customers and partners, also referred to as external identity services, or simply, external identity.

Salesforce identity connects a Salesforce organization's users with external applications and services and provides administrative tools for monitoring, maintaining, and reporting user applications and user authorization. Salesforce identity includes, among other things, the following features:

Cloud-based user directories, so user accounts and information are stored and maintained in one place, while available to other services or applications.

Authentication services to verify users and keep granular control over user access.

An organization can require two-factor authentication, select which applications users can use, and set how often individual users log in to maintain their session. With two-factor authentication, users are required to log in with two pieces of information, such as a username and a one-time password (OTP), whether user-defined OTPs or OTPs generated from software or hardware devices.

Access management and authorization for third-party applications, including user interface integration, so a user's applications and services are readily available.

Application user provisioning, which streamlines the process for providing and removing access to applications to multiple users simultaneously.

To implement Salesforce identity, embodiments of the invention may use any of the following standards:

Security Assertion Markup Language (SAML): an XML-based protocol that allows transfer of user information between services, for example, from Salesforce to Microsoft 365. Applications use this information to authorize users and enable single sign-on (SSO).

OAuth 2.0: an open protocol used for single sign-on to allow secure authorization between applications. OAuth authorization flows describe the options for implementing OAuth in Salesforce organizations.

OpenID Connect: an authentication protocol based on OAuth 2.0 that sends identity information between services. With OpenID Connect, users can log in to another service, like Gmail, and then access their Salesforce organization without logging in again.

My Domain: allows defining an organization's own domain name within the Salesforce domain (for example, https://companyname.my.salesforce.com). My Domain makes it easier to manage login and authentication and allows customization of a company's login page.

Connected Apps: integrate an application with Salesforce using APIs. Connected apps use standard SAML and OAuth protocols to authenticate, provide single sign-on, and provide tokens for use with Salesforce APIs. In addition to standard OAuth capabilities, connected apps allow a Salesforce administrator to set various security policies and have explicit control over who can use the corresponding applications.

Extensions to Salesforce identity, referred to herein as Salesforce external identity, or, simply, external identity, work with external users, for example, providing external users a login page that reflects a particular brand, providing for customizing the login process with various tools, and providing identity services, such as single sign-on (SSO) and social sign-on (in which authentication providers are set up to allow users to log in with their credentials from their social accounts, such as Facebook, Twitter, and LinkedIn). External identity works with communities—the branded spaces for employees, customers, and partners to connect. Embodiments of the invention contemplate customizing and creating communities to deliver specific business applications and services, including identity services. With external identity, customers and partners can access an organization through an external identity community.

Embodiments of the invention make use of identity provider and service provider integration. An identity provider is a trusted provider that uses single sign-on (SSO) to access other websites. A service provider is a website that hosts applications. Embodiments of the invention may use a cloud based computing environment, such as Salesforce, as an identity provider and define one or more service providers. Users may then access other applications directly from the cloud based computing environment using SSO.

Embodiments of the invention provide for extending external identity to third party, websites/web pages outside of or external to the cloud based computing environment. Extending external identity to a third party website makes it easier to incorporate authentication into websites. Creating authenticated sessions between an organization's community in a cloud based computing environment and website visitors extends the organization's reach with its customers. For example, the organization can require that users log in before they access the website. Or when customers change billing information on the website, their contact information can be updated in organization. As information is collected about a user, the user's experience can be customized or tailored accordingly.

According to embodiments, of the invention, web developers are not required to know anything about authentication services to add login capabilities to their web pages. They can rely on embodiments of the invention to take care of the process of authenticating users. Generally, the web developers just need to add a few HyperText Markup Language (HTML) meta tags, or the like, to a web page and a function, e.g., a JavaScript function, to determine what happens when a user successfully logs in to the website. When website visitors access the page, they enter their credentials in a login form generated according to embodiments of the invention.

Embodiments of the invention provide for:
requiring customers to log in before accessing a third party website;
requiring customers to log in to the website before they can make a purchase, e.g., when accessing the web page that contains a shopping cart;
updating customers' billing address in their contact information maintained by the organization in the cloud based computing environment when they purchase something on the website, i.e., integrating the website with the cloud environment's back end;
collecting information about visitors to customize their experience, e.g., gathering information about users during the login process, such as their email address, time zone, and profile picture;
configuring an organization's community with authentication providers, so that website visitors log in using their credentials from any social or identity provider that is configured for the community; and
providing a way to authenticate users through the community when the website does not support authentication through, for example, SAML or OpenID Connect, protocols.

Figure 2:
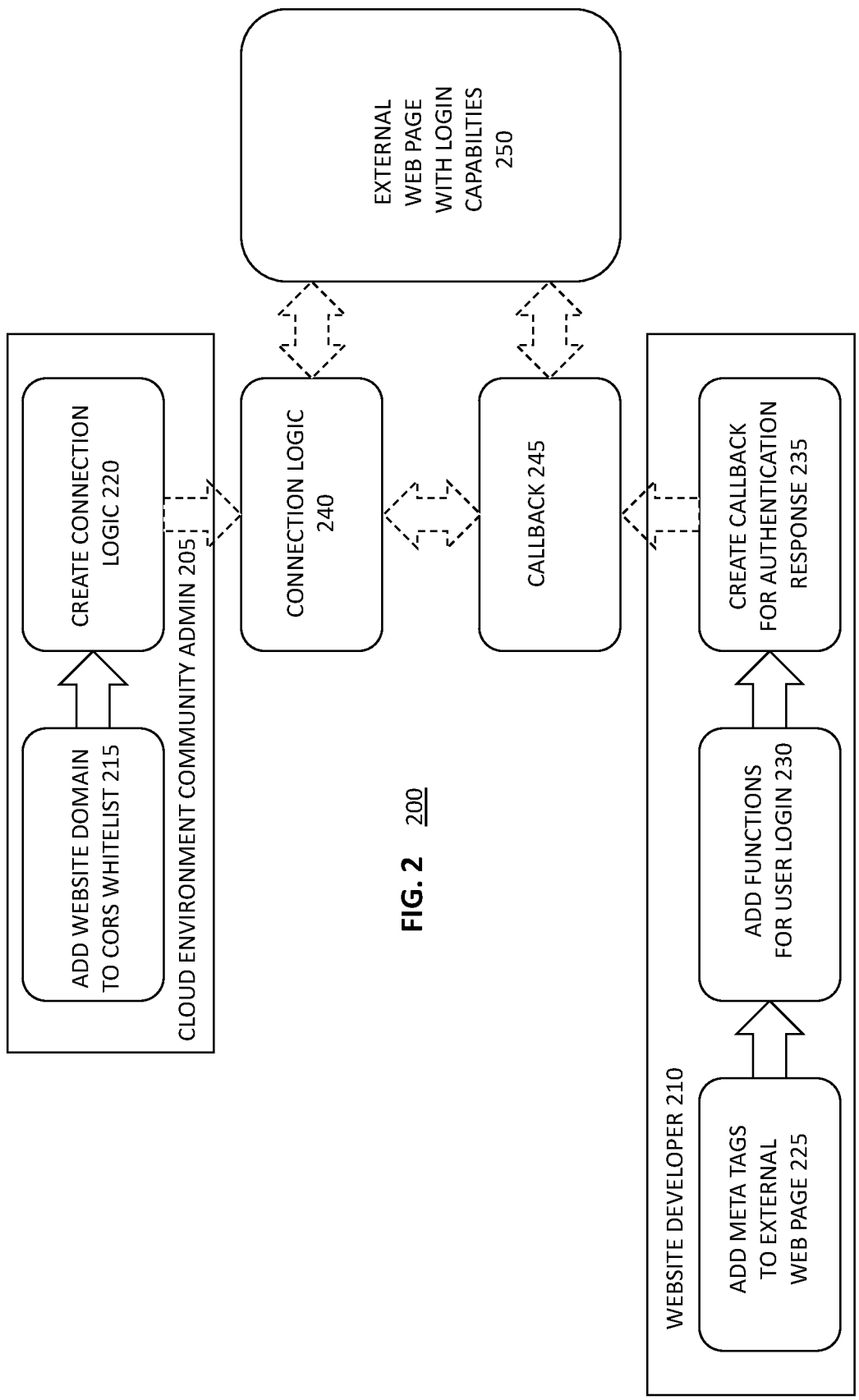
FIG. 2 depicts a diagram illustrating the components and process for implementing authentication of a user login to an external website from a community in a cloud based computing environment in accordance with disclosed embodiments.

With reference to FIG. 2, embodiments of the invention 200, in which a user is able to login to an external web page, are implemented as follows. At logic block 215, the cloud based computing environment's organization administrator (or simply, admin) creates a community, brands the login page, and configures the authentication providers. Then the administrator adds the website domain, which is different from the organization's domain, to a Cross Origin Resource Sharing (CORS) whitelist. Admin action then flows to logic block 220, where the admin creates connection logic 220. The connection logic is put to use at logic block 240 to handle interaction between the community and a third party website 250.

Separately, at logic block 223, a website developer adds HTML meta tags to the web page to, among other things, display a login form. Website developer action then flows to logic block 230, where the web developer supplies JavaScript functions and onlogin and, optionally, onlogout, specifications to determine what happens when a user logs in and out of the website. Website developer action then flows to logic block 235, where the web developer creates a callback, e.g., a URL string. The callback is used at 245 to handle an authentication response between connection logic 240 and the third party website 250, specifying callback-specific meta tags. As a result, when a user clicks a button or the like and enters credentials in the login form, the community authenticates the user. Then the community checks the connection logic 240 to determine the type of access token to grant. The community sends the access token to the callback 245. The callback 245 uses the access token to access the user's information from the community and can cache it locally. The onlogin function determines which information to display to the user. If the website 250 requires ongoing interaction with the community after authentication, the connection logic 240 maintains a connection between the web page 250 and the community. The various logic and steps set forth in the above description with reference to FIG. 2 are further detailed below, with reference to FIGS. 3A, 3B, and 4.

With reference to the method 300 depicted at FIGS. 3A and 3B, at block 305, processing logic receives user input that identifies one or more domains where users are allowed to login to external web pages hosted at those domains. Web requests made outside of website boundaries, for security reasons, are restricted to the current domain. According to one embodiment, however, in order to enable a website to share resources beyond its boundaries, the cloud based computing environment service provider's administrator adds trusted website domains to a CORS (Cross-Origin-Resource-Sharing) whitelist. CORS is an industry standard that enables web browsers to make requests from origins other than their own. Embodiments of the invention populate the Access-Control-Allow-Origin response header with the origin (domain plus protocol) specified in the CORS whitelist. If CORS is not set up, the Access-Control-Allow-Origin header value is set to null, which effectively block all web requests. For embodiments to enable resource sharing across boundaries, the origin listed in the CORS whitelist—the Access-Control-Allow-Origin—must match the origin listed in the request. However, an exact match is not required. For example, if CORS whitelists https://saleforce.com, any request from all ports in this domain are accepted, e.g., a request from https://salesforce.com:6109. Conversely, if CORS whitelists https://saleforce.com:6109, only requests from that port in this domain are accepted, e.g., a request from https://salesforce.com:6109, whereas a request from https://salesforce.com, or https://salesforce.com:3054, would be denied.

At logic block 310, embodiments provide connection logic, separate from the external web page, to connect the external web page with a community of a cloud computing environment hosted on a second domain (listed in CORS) different than the domain for the community. The connection logic handles how the connected community authenticates a user when the user logs into the external web page. The community admin creates a connected application (connection logic 240) to connect the community with a website. The connected application handles communication between the web page and the cloud based computing environment back end.

The connected application controls how the initial authentication process is handled. Then it continues to handle the interaction between the website and community during the user's active session. When creating the connected application, the admin creates callback URLs for both the connected application and the website, which are used to retrieve an access token during the initial authentication process. The connected application and callback URL are interconnected, so there is a "chicken or egg" issue. The connected application needs the website's callback URL. The website needs the connected app's URL. So at this point in the process, the admin may specify a placeholder URL, then can come back later to replace it with the correct URL.

In one embodiment, the connected application has an associated consumer key, which is the connected application's unique identifier to identify itself to the cloud environment's back end. The admin should save the consumer key for later. It will be used when entering meta tags on the website, as further described below. It is the value for the meta tag "salesforce_client_id." in the example provided below.

At logic block 315, the connection logic that handles how the connected community authenticates the user when the user logs into the external web page provides a callback Uniform Resource Locator (URL) string for the external web page that is used to retrieve an access token from the connected community during authentication of the user when the user logs into the external web page.

At logic block 320, the connection logic that handles how the connected community authenticates the user when the user logs into the external web page includes connection logic that handles communication between the external web page and the connected community during an active session of the user that is established once the user is authenticated and logged in to the web page.

At logic block 325, the connection logic that handles how the connected community authenticates the user when the user logs into the external web page includes logic to select information about the user to be retrieved from the connected community when the user logs into the external web page. In one embodiment, as part of the login process, information about the user who is logging in is retrieved from the cloud computing environment. An administrator can determine what kind of information to collect by creating custom attributes for the connected application 240. These custom attributes for the connected application can be created either declaratively, by providing input to choose the user information desired to be collected, or programmatically, for example, by using the customAttributes method of the Apex class Auth_ConnectedAppPlugin.

Figure 4:
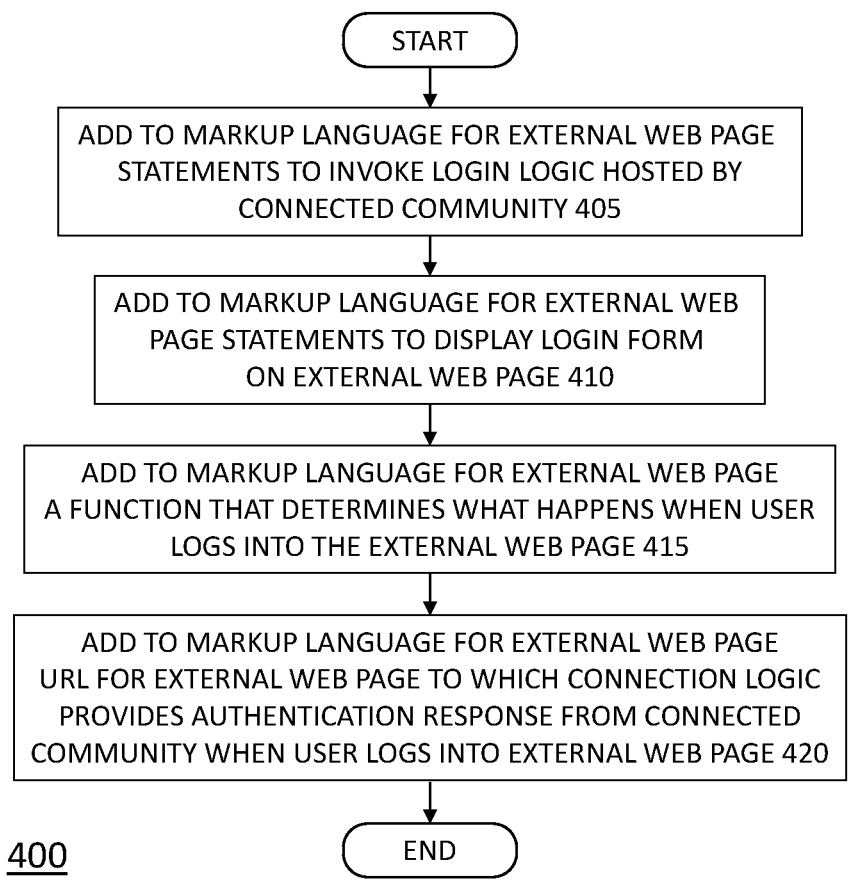
FIG. 4 depicts a flow diagram illustrating a method for implementing authentication of a user login to an external website from a community in a cloud based computing environment in accordance with disclosed embodiments.

With reference to the method 400 depicted at FIG. 4, at block 405, processing logic receives web developer input to add to a markup language for the external web page a plurality of statements that will invoke login logic hosted by the connected community to allow the user to login to the web page. In particular, in one embodiment, on the web page where the web developer wants to add login capabilities, meta tags are entered inside the <head> HTML element at the top of the page, as set forth below:

```
<!DOCTYPE html>
<html lang="en">
  <head>
    <meta charset="utf-8">
    <meta http-equiv="X-UA-Compatible" content="IE=edge">
    <meta name="viewport" content="width=device-width, initial-scale=1">
    <title>FIX, curated coffee components</title>
    <link href="reset.css" rel="stylesheet">
    <link href="//fonts.googleapis.com/css?family=Source+Sans+Pro:200,300,600" type="text/css" rel="stylesheet">
    <link href="main.css" rel="stylesheet">
    <meta name="salesforce-community" content="https://id.fixcoffee.info">
    <meta name="salesforce-client-id"
```

-continued

```
content="3MVG9SemV5D80oBc_KK4v07s_v92mNoV_rqHj3eBhQXKe6VmIYjt0AnR1xrJTejXZbv0HJ4
DyN5AO60_NXvfW">
    <meta name="salesforce-redirect-uri" content="https://getfix.herokuapp.com/
_callback.html">
    <meta name="salesforce-mode" content="modal">
    <meta name="salesforce-target" contect="#sign-in-link">
    <meta name="salesforce-save-access-token" content="true">
    <meta name="salesforce-login-handler" content="onLogin">
    <meta name="salesforce-logout-handler" content="onLogout">
    <link href="https://id.fixcoffee.info/servlet/servlet.loginwidgetcontroller?
type=css" rel="stylesheet" type="text/css" />
    <script src="https://id.fixcoffee.info/servlet/
servlet.loginwidgetcontroller?type=javascript_widget" async defer></script>
</head>
```

The HTML above also contains a set of meta tags that specify how to display a login form in accordance with logic block 410, and contains a link to CSS resources and a script to invoke external identity login capabilities on the server. The CSS and servlet URLs reside on static endpoints hosted by the community. A web developer will replace the https://embeddedlogin-developer-edition.na99.force.com/demo/ with the path to the correct community.

```
1   <link href="https://embeddedlogin-developer-
    edition.na99.force.com/demo/servlet/servlet.loginwidgetcontroller?type=css"
    rel="stylesheet" type="text/css" />
2   <script src="https://embeddedlogin-developer-
    edition.na99.force.com/demo/servlet/servlet.loginwidgetcontroller?type=javascrip
    t_widget" async defer></script>
```

As shown above, the web developer enters meta tags on the web page where login capabilities are wanted, specifies the community URL, what the login form looks like, the location of the CSS style sheet, and more. In particular, in one embodiment, open the web page to which login capabilities are to be added. Within the <head> HTML element at the top of the file, the web developer enters the following meta tags, specifying the values from the actual configuration:

salesforce-community
salesforce-client-id
salesforce-redirect-ur
salesforce-mode
salesforce-target
salesforce-login-handler
salesforce-logout-handler
salesforce-server-callback (required if using a server-side callback)

In one embodiment, the web develop may enter the following optional meta tags:

salesforce-forgot-password-enabled
salesforce-self-register-enabled
salesforce-mask-redirects
salesforce-use-min-j s
salesforce-cache-max-age
salesforce-save-access-token The web developer, in one embodiment, enters the link to the location of CSS resources. The CSS resides on a static endpoint hosted by the community:

```
<link href="https://embeddedlogin-developer-
edition.na99.force.com/demo/servlet/servlet.loginwidgetcontroller?type=css"
rel="stylesheet" type="text/css" />
```

According to an embodiment, the web developer further adds following script, replacing the community URL https://embeddedlogin-developer-edition.na99.force.com/demo with the actual path:

```
<script src="https://embeddedlogin-developer-
edition.na99.force.com/demo/servlet/servlet.loginwidgetcontroller?type=javascript_widg
et" async defer></script>
```

According to an embodiment, the web developer can change the default behavior of logging into to an external web page on the server by modifying the <script> tag inside the <head> HTML element at the top of the web page.

The script loads a Java servlet that enables login capabilities. The following parameters can be added to the script to change how the servlet behaves.

min=false
generates a readable JavaScript version. By default, the embodiment loads the JavaScript in a minimized, lightweight state that's hard to read. Use min=false to generate a response that's easier to read.

```
1   <script src="https://embeddedlogin-developer-
    edition.na99.force.com/demo/servlet/
2   servlet.loginwidgetcontroller?type=javascript_widget&min=false"
    async defer></script>
``` cacheMaxAge=n
sets the cache control maximum age header, which the browser uses to determine whether the cached content is fresh or must be refreshed from the server. By default, the cache is cleared every 24 hours, in one embodiment. The web developer can change the maximum age, where n is the specified number of seconds. To improve performance, increase the cache age. However, as a result, JavaScript updates will be received less frequently because the updates occur when the cache is cleared. Here, the cache refreshes every three days.

```
1   <script src="https://embeddedlogin-developer-
    edition.na99.force.com/demo/servlet/
2   servlet.loginwidgetcontroller?type=javascript_widget&cacheMaxAge=259200"
    async defer></script>
```

At logic block 415, embodiments add a login function to the body of the webpage, in particular, to the markup language for the external web page that determines what happens when the user logs into the web page. As an example, on the web page, the web developer can provide a login and optional logout JavaScript function in the body to handle onLogin and onLogout events. With these functions, the web developer determines what happens when users log in and out successfully.

A code example follows that replaces the login button with a user's name and profile picture (avatar) upon successful login. The response returns the user information.

```
01   function onLogin(identity) {
02
03       var targetDiv =
         document.querySelector(SFIDWidget.config.target);
04
05       var avatar = document.createElement('a');
06       avatar.href = "javascript:showIdentityOverlay( );";
07
08
09       var img = document.createElement('img');
10       img.src = identity.photos.thumbnail;
11       img.className = "sfid-avatar";
12
13       var username = document.createElement('span');
14       username.innerHTML = identity.username;
15       username.className = "sfid-avatar-name";
16
17       var iddiv = document.createElement('div');
18       iddiv.id = "sfid-identity";
```

```
19
20       avatar.appendChild(img);
21       avatar.appendChild(username);
22       iddiv.appendChild(avatar);
23
24       targetDiv.innerHTML = '';
25       targetDiv.appendChild(iddiv);
26
27
28   }
```

Optionally, the web developer may add code to the login function to retrieve user information from the community. Further optionally, the web developer may add a logout function to the body of the web page. In particular, a function can be written to determine what happens when a user logs out. This following code example clears the user's session and reloads the login button.

```
1   function onLogout( ) {
2       SFIDWidget.init( );
3
4   }
```

At logic block 420, embodiments of the invention add to the markup language for the external web page a callback Uniform Resource Locator (URL) string for the external web page to which the connection logic provides an authentication response from the connected community when the user logs into the external web page. In one embodiment, when a user logs in to a website, the callback receives the access token and uses it to retrieve user information. Both the access token and user information can be stored to local storage. Depending on the implementation, the web developer can create a callback to handle the response on either the website (client) or the server.

When the admin creates the connected application as described earlier, the URL to this callback was input. The callback is mainly for security, and it is used to receive the access token. It then uses the token to fetch user information from the community and write the information to the local storage, which is on the community domain. After writing user information to local storage—which is equivalent to a successful login, the callback redirects the user back to the index page.

The main difference between a client-side and server-side callback is how the access token is received. For a normal client-side callback that is a web page, the callback receives the access token. For a server-side callback, the server gives the callback a one-time code. Then the callback exchanges the code for an access token.

For server-side callbacks, after using the access token to get the user information, the server writes the information out to the served file, such as an HTML file. After the user information is read on the client, it is written to local storage, which is on the community domain.

To create a client-side callback, the web developer adds a web page to the website and specifies a few meta tags inside the <head> HTML element.

The client-side callback takes the access token from the community and writes it to local browser storage for future access. Regardless of how many web pages to which login capabilities are added, the web developer need create only one callback page.

For security, the callback page is on the same domain as the web pages containing login capabilities.

In one embodiment, the web developer creates a page on a website and calls it _callback, for example, _callback.php. Then the developer enters the following meta tags inside the <head> HTML element of this _callback page.
  salesforce-community
  salesforce-allowed-domains
  salesforce-mode (where the value ends in -callback)

The value of the salesforce-mode meta tag is the same mode specified in the login web page with the -callback suffix. For example, if salesforce-mode on the web page is set to modal, the value is modal-callback. In one embodiment, the web developer may enter these optional meta tags:
  salesforce-save-access-token with the value true to save the access token after initialization. By saving the access token, a user can continue to interact with the community during the active user session.
  salesforce-logout-on-browser-close
  Keep the body empty: <body></body>.

An example follows:

```
01   <html>
02   <head>
03   <meta name="salesforce-community"
     content="https://embeddedlogin-developer-
     edition.na99.force.com/demo">
04   <meta name="salesforce-client-id"
     content="3MVG9Iu66FKeHhIPrRneLTDFdiuLfgLjycFpg6Sb
     LpZAJScEXuD.oRdaWnJE7QGNFWHxunp0ut1">
05   <meta name="salesforce-mode" content="inline-callback">
06   <meta name="salesforce-save-access-token" content="false">
07   <meta name="salesforce-allowed-domains"
     content="embeddedlogin.heroku.com">
08   <eta name="salesforce-redirect-uri"
     content="https://embeddedlogin.heroku.com/_callback.html">
09   <meta name="salesforce-target" content="#salesforce-login">
10   <meta name="salesforce-login-handler" content="onLogin">
11   <meta name="salesforce-logout-handler" content="onLogout">
12
13   <script src="https://embeddedlogin-developer-
     edition.na99.force.com/demo/servlet/
14   servlet.loginwidgetcontroller?type=javascript_widget"
     async defer></script>
15   </head>
16   <body></body>
17   </html>
```

In one embodiment, to create a server-side callback, the web developer creates a servlet using a preferred language. In one embodiment, the server-side callback is used instead of a client-side callback web page to avoid exposing the access token on the client. When using the server-side callback, the web developer creates a separate servlet to authenticate the user, retrieve user's identity information, and form the HTTP response. Details of the process follow.

First, execute an OAuth web-server flow to authenticate the user logging in. Then, issue an HTTP POST against the community's token endpoint where the grant_type parameter must be authorization_code. The server process received the authorization code in an HTTP request and now the process must include the code in this POST. If the HTTP POST completes properly, the user who is logging in is authenticated and the community returns the access token in a JSON body. Parse the results of the OAuth web-server flow, then use the access token to get identity information about the now authenticated user. If the web developer added customer attributes when creating the connected application as described above, the customer attributes are included in the JSON body. Next, form an HTML response. The response, in one embodiment, contains the following meta tags.
  salesforce-community
  salesforce-mode (where the value ends in -callback)

The value of the salesforce-mode meta tag is the same mode specified in the web page with login capabilities with the -callback suffix. For example, if salesforce-mode on the web page is set to modal, the value is modal-callback.
  salesforce-server-callback (where the value must be true)
  salesforce-server-response
  salesforce-server-starturl
  salesforce-target
  salesforce-allowed-domains The web developer can include the salesforce-save-access-token with the value true to save the access token after initialization. By saving the access token, a user can continue to interact with the community during the active user session. As a next step, in the login web page, specify the following meta tags. Add the salesforce-server-callback meta tag with the value true. This meta tag indicates that the callback to handle the HTTP response is on the server.
  <meta name="salesforce-server-callback" content="true">

The salesforce-redirect-uri meta tag should reference the location of the server-side callback servlet. Further, the embodiment should use the same URL as specified in the callback URL field of the connected application.

```
<meta name="salesforce-redirect-
uri"content="https://embeddedlogin.heroku.com/servlet/servlet.serversidecallback>
```

The salesforce-mode on this web page matches the mode on the server-side callback. An example follows. This server callback servlet uses base64 encoding in the server response.

```
001   package servlet;
002
003   import org.apache.commons.httpclient.HttpClient;
004   import org.apache.commons.httpclient.methods.GetMethod;
005   import org.apache.commons.httpclient.methods.PostMethod;
006
007   import org.json.JSONObject;
```

-continued

```
008
009     import javax.servlet.ServletConfig;
010     import javax.servlet.ServletException;
011     import javax.servlet.ServletOutputStream;
012     import javax.servlet.annotation.WebServlet;
013     import javax.servlet.http.HttpServlet;
014     import javax.servlet.http.HttpServletRequest;
015     import javax.servlet.http.HttpServletResponse;
016
017
018     import javax.servlet.http.*;
019     import java.io.IOException;
020     import java.io.PrintWriter;
021     import java.net.URLDecoder;
022     import java.nio.charset.StandardCharsets;
023     import java.util.Base64;
024
025     @WebServlet(
026             name = "CallbackServlet2",
027             urlPatterns = {"/_callback"}
028         )
029     public class ServerSideCallbacks extends HttpServlet{
030
031         // Client ID
032         private static final String CLIENT_ID=
033     "3MVG9xOCXq4ID1uF8V6oKd32SPVi6FHwEOQlQ5BjvaKX.5QZpGe4Z3F4f
c6KvMYsQ.fi314cp0oZ8KpOBs4Mh";
034
035         // client secret
036         private static final String CLIENT_SECRET = "9103416584217247123";
037
038         @Override
039         public void init(ServletConfig config) throws ServletException {
040             super.init(config);
041         }
042
043         @Override
044         protected void doGet(HttpServletRequest request, HttpServletResponse
response)
045             throws
046             ServletException, IOException {
047
048             String code = request.getParameter("code");
049             if (code != null) {
050                 code = URLDecoder.decode(code, "UTF-8");
051             }
052             String startURL = request.getParameter("state");
053             if (startURL != null) {
054                 startURL = URLDecoder.decode(startURL, "UTF-8");
055             }
056
057             String tokenResponse = null;
058             String communityUrl = null;
059             HttpClient httpclient = new HttpClient( );
060             try {
061                 // community_url parameter passed from redirect uri.
062                 communityUrl = request.getParameter("sfdc_community_url");
063                 // Token endpoint : communityUrl + "/services/oauth2/token";
064                 PostMethod post = new
PostMethod(communityUrl+"/services/oauth2/token");
065                 post.addParameter("code",code);
066                 post.addParameter("grant_type","authorization_code");
067                 // Consumer key of the Connected App.
068                 post.addParameter("client_id", CLIENT_ID);
069                 // Consumer Secret of the Connected App.
070                 post.addParameter("client_secret",CLIENT_SECRET);
071
072                 // Callback URL of the Connected App.
073                 post.addParameter("redirect_uri",
074                     "https://boiling-brushlands-41143.herokuapp.com/_callback");
075
076                 httpclient.executeMethod(post);
077                 tokenResponse = post.getResponseBodyAsString( );
078                 post.releaseConnection( );
079
080                 System.err.println("tokenResponse: " + tokenResponse);
081             } catch (Exception e) {
082                 throw new ServletException(e);
```

```
083             }
084
085
086             JSONObject identityJSON = null;
087             try {
088                 JSONObject token = new JSONObject(tokenResponse);
089                 // get the access token from the response
090                 String accessToken = token.getString("access_token");
091                 String identity = token.getString("id");
092                 httpclient = new HttpClient( );
093                 GetMethod get = new GetMethod(identity + "?version=latest");
094                 get.setFollowRedirects(true);
095                 get.addRequestHeader("Authorization", "Bearer " + accessToken);
096
097                 // get identity information using the access token
098                 httpclient.executeMethod(get);
099                 String identityResponse = get.getResponseBodyAsString( );
100                 get.releaseConnection( );
101                 identityJSON = new JSONObject(identityResponse);
102                 identityJSON.put("access_token", accessToken);
103             } catch (Exception e) {
104                 throw new ServletException(e);
105             }
106
107
108             response.setContentType("text/html; charset=utf-8");
109             PrintWriter out = response.getWriter( );
110
111             // Notice that we're using base64 encoded
112             String outputStr = "<html><head>\n" +
113                 "<meta name=\"salesforce-community\" content=\""+ communityUrl +"\">\n" +
114                 // notice the -callback in the salesforce-mode content value
115                     "<meta name=\"salesforce-mode\" content=\"modal-callback\">\n" +
116                 "<meta name=\"salesforce-server-callback\" content=\"true\">\n" +
117
118                 // send the identity information back to the Embedded Login
119                     "<meta name=\"salesforce-server-response\" content='" +
120                 Base64.getEncoder( ).encodeToString(identityJSON.toString( ).
121                     getBytes(StandardCharsets.UTF_8))+"'>\n" +
122                 "<meta name=\"salesforce-server-starturl\" content='" + startURL +"'>\n" +
123                 "<meta name=\"salesforce-target\" content= \"#salesforce-login\">\n"+
124                 "<meta name=\"salesforce-allowed-domains\" " +
125                 content=\"boiling-brushlands-41143.herokuapp.com\">\n" +
126                 "<script src=\""+ communityUrl +
127                 "/servlet/servlet.loginwidgetcontroller?type=javascript_widget\"" +
128                 " async defer></script>\n" +
129                 "</head><body></body></html>";
130             out.write(outputStr);
131         }
132
133     }
```

An overview of the authentication process, according to an embodiment using Salesforce's cloud based computing environment and Identity service involves:

1. The user entering a username and password or social credentials in the login form on the web page.
2. Salesforce validates the credentials and then redirects the response to the OpenID authorization endpoint https://login.salesforce.com/services/oauth2/authorize. The connected application ID of the connected application is passed in, which specifies how the OAuth access token is granted. The community issues the access token based on how the connected app is configured.
3. Salesforce sends the access token to the callback.
4. The callback receives the access token, parses it out as a message, and caches the access token. If it is a client-side callback, the token is cached in the web browser local storage.
5. The callback uses the access token to call the Salesforce Identity service endpoint to pull the required and authorized information about the user.
6. The callback stores the user information with the access token.
7. The connected application gets the user information from storage and checks the online function to determine which login information to show on the web page and how.
8. If the website does not require ongoing interaction with Salesforce after initial login, the access token can be released. If the web page continues to interact with Salesforce, the access token remains in storage. The connected application maintains the connection between the page and Salesforce and uses the access token to retrieve data from Salesforce.

The authentication process happens in an iframe, and Salesforce sets the salesforce-mask-redirects meta tag to true to hide the process from the user. However, if the organization uses login flows or two-factor authentication, set the salesforce-mask-redirects meta tag to false. The user goes to Salesforce to complete the login process.

As described above, when the admin creates the connected application as described earlier, the URL to this callback is input. The callback is primarily for security, and is used to receive the access token. The callback then uses the token to fetch user information from the community and write the information to the local storage, which is on the community domain. For example, the user information can be cached by the web browser. Advantageously, once the user information is stored locally and available to the web browser, the user is automatically logged in to and out of each of multiple tabs associated with the external website, when opened and closed on same browser because each tab is polling local storage when it is established.

One embodiment provides features similar to the multiple-tab feature described above, but across different browsers on the same device. In such an embodiment, if a user logs in to the external website using one browser, say, the Firefox browser, available from the Mozilla Foundation and its subsidiary, Mozilla Corporation, their user information, which is obtained when logging into the website using Firefox, is stored locally and so also available and used to automatically log the user in to the external website when the user begins using another browser, say, the Chrome browser, available from Google.

In another embodiment, the browsers may be running on the same client device or on different client devices. In the latter case, when a user logs in to the external website using the Firefox browser, their user information, obtained when logging into the website, is stored locally on the client device. The local storage from that client device can be synchronized with local storage on a different client device, and so that is it also available and used to automatically log the user in to the external website when the user accesses the website via a browser running on the different client device. For example, a user can log in to the external website using a browser on their laptop computer, wherein their user information, obtained when logging into the website, is stored locally on the laptop computer. The local storage from laptop computer can be synchronized with local storage on the user's desktop computer, and so when the user later logs in to the external website via a browser running on the synchronized desktop computer, the user information is there for use in local storage and the user is automatically logged in as a result.

Embodiments that provide automatically logging into the external website from different browsers on the same or different devices may, in one embodiment, use peer-to-peer communications with WebRTC, an open project that provides browsers and mobile applications with Real-Time Communications (RTC) capabilities via APIs. Embodiments using certain browsers, such as Google Chrome, take advantage of the chrome.storage API (available since Chrome version 25) to store, retrieve and track changes to user data. The chrome.storage API has been optimized to meet the specific storage needs of extensions. It provides the same storage capabilities as the chrome localStorage API with the following differences: 1) user data can be automatically synced with Chrome sync (using storage.sync); 2) an extension's content scripts can directly access user data without the need for a background page; 3) a user's extension settings can be persisted even when using split incognito behavior; 4) it's asynchronous with bulk read and write operations, and therefore faster than localStorage API which uses blocking and serial operations; 5) user data can be stored as objects (the localStorage API stores data in strings); and 6) enterprise policies configured by an administrator for the extension can be read (using storage.managed with a schema).

As discussed above, embodiments of the invention provide users a login page to an external website that reflects a particular brand, provide for customizing the login process with various tools, and provide identity services, such as single sign-on (SSO) and social sign-on, for the external web site. The embodiments work with communities—the branded spaces for employees, customers, and partners to connect. The following described embodiment provides the further advantage of providing more control over a community's login experience, in particular, according to one embodiment, dynamically branding a login page of an external website depending on certain conditions such as who is the user that is logging in, and/or from where is the user logging in. With this embodiment, the cloud based computing environment service provider can change a user's login experience with dynamic branding. In particular, in one embodiment, external identity partners and customers have more control over the community's login experience—the experience users embark on when they log in to the external website. One embodiment provides for changing a logo on the login page depending on whether the user is an employee or customer. Another embodiment provides for displaying a particular self-registration page based on the user's country code.

The term "login experience" is used herein instead of "login page" to refer to a complete login exchange to an external website. A login experience refers to the initial login page plus any secondary pages that are added to customize login, for example, to provide 2-Factor Authentication (2FA) authentication, terms & conditions, or a login flow.

Dynamic branding, as that term is used herein, and according to the embodiment described below, goes beyond being able to modify the login page's branding options, such as a logo image (i.e., a graphic mark, emblem, or symbol used to aid and promote public identification and recognition), a background color, and a so-called right-frame URL, to provide for customizing the branding dynamically depending on certain conditions like who the user is or where the user is logging in from. For example, a company may want to brand the login page depending on whether the user logging in is an internal employee or external customer or partner. According to the embodiment, the login page for each type of user has a different logo and, optionally, a different right-frame URL, yet both groups are served from the same login page. (A right-frame URL refers to content displayed on the right side of the login form in one embodiment, but of course, the content could be displayed in other locations of the login form, and is more generally referred to herein as an HTML Inline Frame element (<iframe>) or similar framework that represents a nested browsing context, effectively embedding another HTML web page into the current login web page. A developer can include any number of <iframe> elements within a document, each of which embeds another document inside the <body> of a web page).

According to one embodiment, if a default login page is used, the embodiment allows for supplying different logos and right-frame URLs dynamically (i.e., at the time of logging in), whereas if a custom login page is used, Visualforce (a framework that allows developers to build custom user interfaces) and Apex controllers (an Apex language class that provides custom logic and data manipulation that can be used by a Visualforce-created web page) can be used to implement a dynamic login experience, including setting logos, right-frame URLs, and background colors.

According to the embodiment, when users log in, the URL at which the user is logging in contains an experience identifier parameter {expid}. An experience ID value stored in a browser cookie determines what the user experiences. For example, the logo contains the {expid} parameter:

https://mycompanyname.com/{expid}_logo.png

If the value of the experience ID is internal, {expid} becomes, for example, "internal_logo.png" at runtime:

https://mycompanyname.com/internal_logo.png and a logo for an internal user is displayed. If, on the other hand, the value of the experience ID is external, {expid} becomes, for example, "external_logo.png" at runtime:

https://mycompanyname.com/external_logo.png and a logo for an external user is displayed.

In one embodiment, for a default login page, the admin specifies the experience ID parameter to the URLs from a community workspaces or community management administration, login and registration page. For a dynamic custom login page, the admin uses tools such as Visualforce and the Apex System.Site class methods getExperienceId and setExperienceId, available from the assignee of the present invention.

In one embodiment, the admin can also set extend the following endpoints with the expid value:

```
community-url/services/oauth2/authorize/expid_value
community-url/idp/endpoint/HttpPost/expid_value
community-url/idp/endpoint/HttpRedirect/expid_value
community-url_login_page?expid={value}
community-url/CommunitiesSelfReg?expid={value}
secur/forgotpassword.jsp?expid={value}
```

This dynamic branding feature is applicable to all login pages. A default login page supports dynamic logos and, optionally, "right-side URLs" (described below). A custom login page supports dynamic logos, and the ability to implement whatever dynamic experience the developer chooses. For example, the developer can brand an external identity community login experience on pages used to log in users, verify identities, reset passwords, and register new members; replace logos, change the background color and login button, and modify the footer text; provide a URL to display content somewhere on the login form, for example, the right side of the login form (a "right-side URL"). A scenario in which dynamic branding used, and accompany implementation details, is provided below.

Dynamic branding is useful for but not limited to multi-brand companies. A company can create a single login page that determines which brand or logo appears at run time. All brands are served from the same login page that serves the same community. In the following scenario, Fix Corporation has a single external community to handle its two brands, Fix Coffee and Fix Chocolate. The corporation uses dynamic branding to customize the login experience for each brand. When customers click a link to log in, Fix presents a login page based on the brand indicated in the login URL.

Fix has a set of resources—including a logo and right-frame URL—for each brand. These resources are hosted on its content management system (CMS). So, for example, the URL to the Fix Coffee logo is https://www.my-cms.com/coffee/logo.png. Likewise, the URL to the Fix Chocolate logo is https://www.my-cms.com/chocolate/logo.png.

Fix corporation implements dynamic branding by using a placeholder, or experience ID (expid) in the URL to represent each brand. That is, the URL contains the expid dynamic URL, which is then replaced by its value at run time. In the scenario, the dynamic URL uses the expid: https://www.my-cms.com/{expid}/logo.png. Then {expid} becomes either https://www.my-cms.com/coffee/logo.png or https://www.my-cms.com/chocolate/logo.png at run time. If the customer at run time clicks a link to log in to Fix Coffee, the link contains an expid query parameter set to expid=coffee:

https://fix.force.com/login?expid=coffee

This URL is the login endpoint to the community branded as Fix Coffee. It is up to the implementation to determine how the expid query parameter is set. For example, it can be contained in an email link or set with a click of a button. In one embodiment, the user may select the brand from a reseller partner program page.

Figure 8:
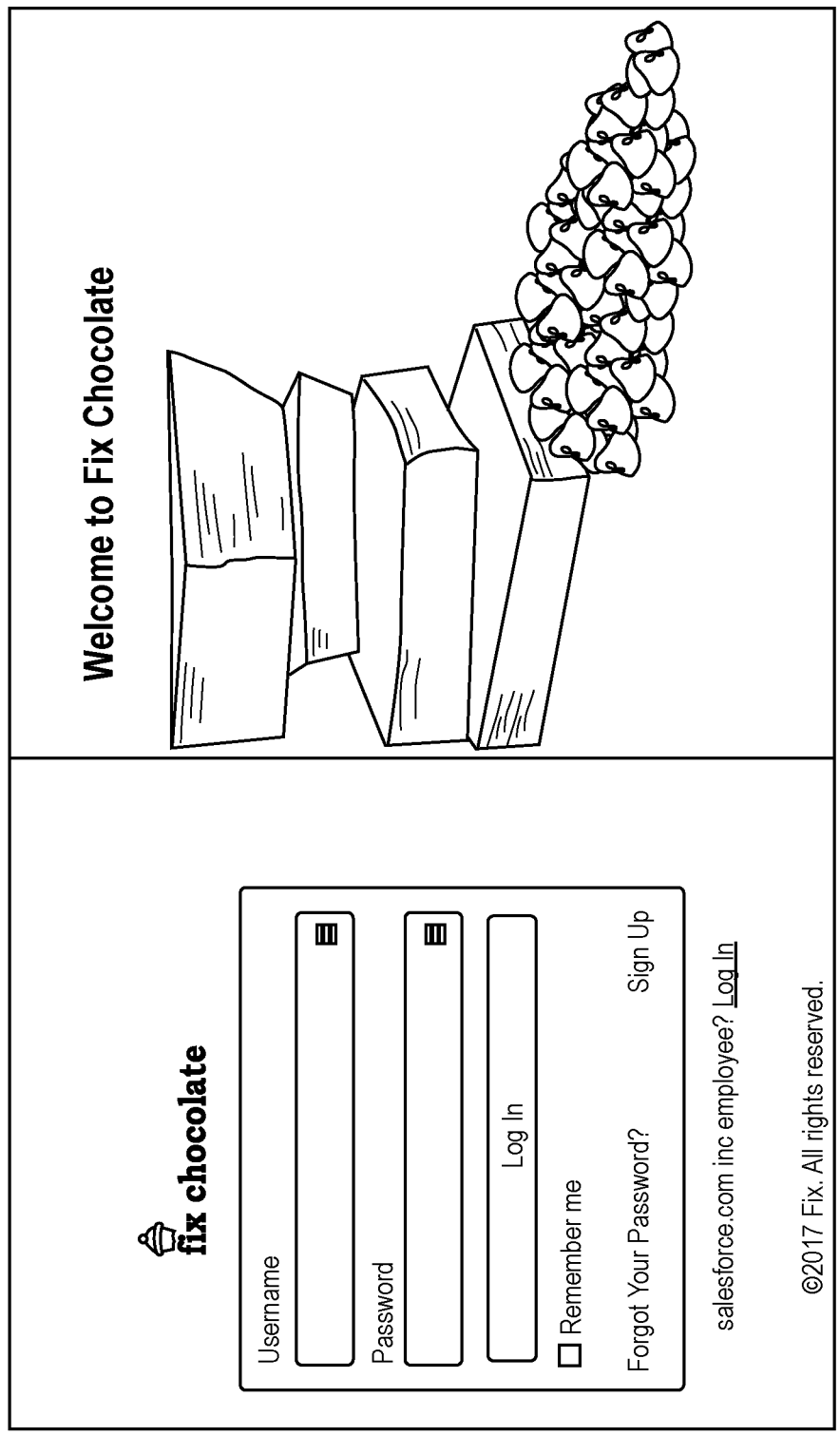
FIG. 8 illustrates a login page, in accordance with one embodiment.
Figure 9:
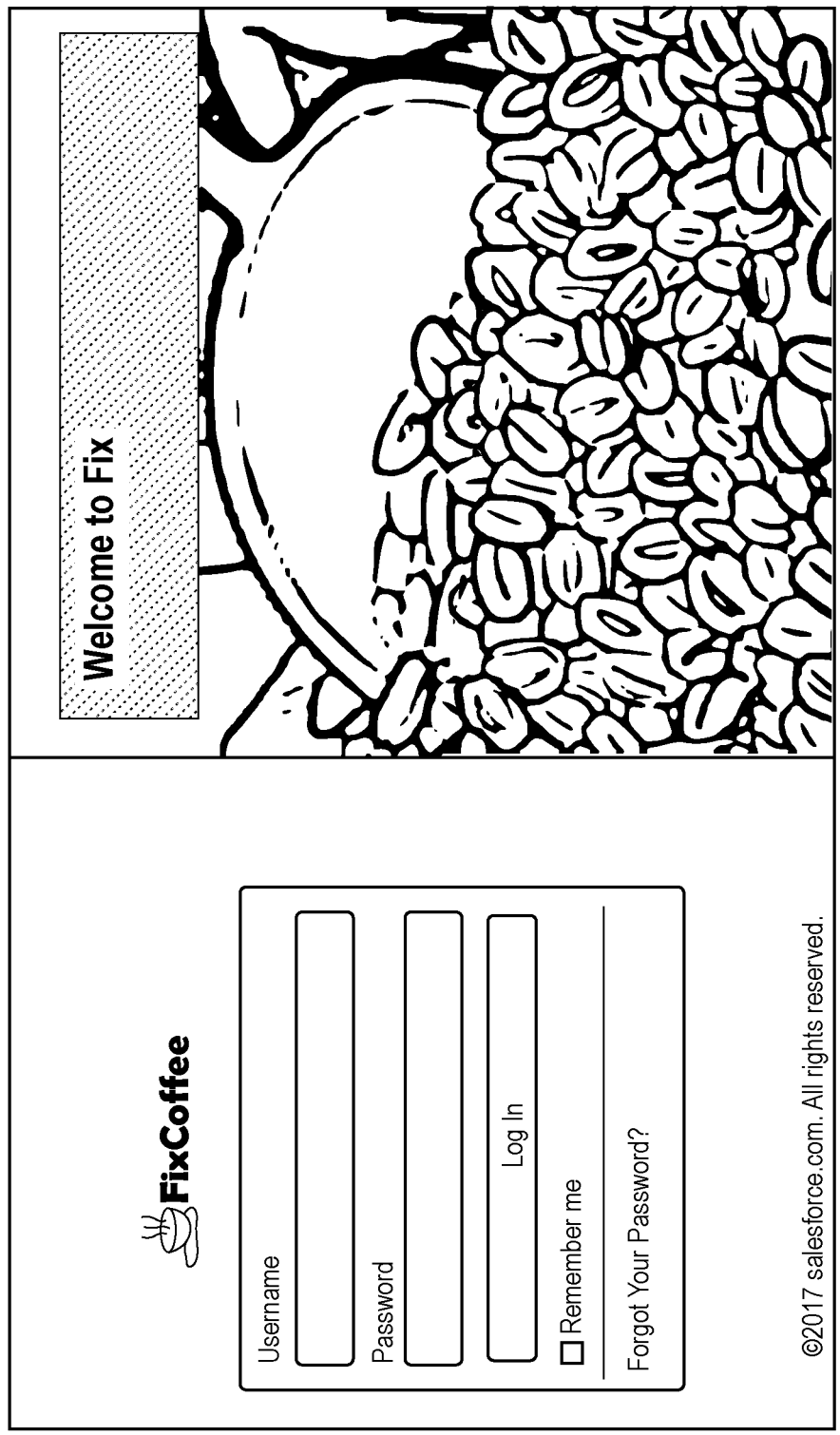
FIG. 9 illustrates a login page, in accordance with one embodiment.

When the user selects chocolate, the link to the login page is set to https://fix.force.com/login?expid=chocolate. Chocolate fans are greeted with the Fix Chocolate login page, complete with its chocolate-branded logo and right-side content, as seen in FIG. 8. A click from a coffee fan, however, generates the login page URL https://fix.force.com/login?expid=coffee, and the Fix Coffee login page appears with its coffee-branded logo and right-side content, as seen in FIG. 9.

One embodiment controls three types of login pages: a default page that the cloud based computing environment service provider (e.g., Salesforce) provides, a community builder page that comes with a community builder tool, and a custom login page that is created, e.g., with Visualforce or a similar such framework.

Dynamic branding can be implemented for default and community builder login pages. The dynamic URL contains the expid placeholder for the desired logo and right-frame content, for example, https://www.my-cms.com/{expid}/logo.png and https://www.my-cms.com/{expid}/index.php respectively. The right-frame URL displays the contents of the URL in an iframe. At run time, the external community replaces the dynamic URL with the brand specified by the expid value (for example, coffee) in the query parameter.

The brand that appears at run time depends on the expid dynamic URL (the expid signal) specified. For example, given the dynamic URL, https://www.my-cms.com/{expid}/logo.png, Fix Coffee appears when the login URL is https://fix.force.com/?expid=coffee.

The embodiment delivers different brands, or user experiences, based on how the expid query parameter gets set in the implementation. One might set it in a URL that is sent to community users in an email, or one might set the URL on a login button. One can also set the query parameter programmatically with the setExperienceId method of the Apex System.Site class.

In addition to using dynamic branding for the login process, it can be used to brand the user's experience during the entire user session. To do so, one embodiment instructs the community to store the expid value in the user's browser. When stored, it can be retrieved as long as the user is logged in to the community.

When specifying the logo and right-frame URLs, note that most browsers do not allow mixing the http:// and https:// protocols on the same page, and the URL for the so-called right-frame URL content should use the same protocol as the community. Generally, it is recommended, according to the embodiment, to use https:// for logo and right-frame URLs.

As mentioned above, dynamic URLs can be set up for default and community builder login pages. Custom login pages can be added to the community regardless of the template that is used to create the community. Dynamic URLs can be entered for the logo and right-frame content, for example, https://www.my-cms.com/{expid}/logo.png and https://www.my-cms.com/{expid}/index.php.

For custom login pages, one can implement dynamic URLs with custom login logic, e.g., a custom Apex controller. Use methods such as the Apex methods getExperienceId and setExperienceId of the System.Site class to retrieve and store the expid value. The brand that appears at run time depends on the expid dynamic URL that is specified on the Apex page. The dynamic URL, https://www.my-cms.com/{expid}/logo.png, displays the Fix Coffee brand when the login URL is https://fix.force.com/?expid=coffee. In this example, the background image of the login page depends on the value of expid:

```
01  <apex:page docType="html-5.0" controller="CustomLoginController" showHeader="false" sidebar="false"
02  <style>
03      body {
04      background-image: url("https://www.my-cms.com/{!ExpID}/promo.jpg}");
05      width: 500px;
06      clear: both;
07      margin: 40 px 50px;
08      vertical-align: middle;
09      }
10      h2 { color:#5F9EA0; }
11  </style>
```

In the custom login controller, one embodiment includes code to extract the expid value from the query parameter:

```
01      Global CustomLoginController( )
02      {
03          ...
04          Expid = getExpidFromURL( );
05
06          //Get the expid parameter from query string
07          Public string getExpidFromURL( )
08          {
09              String expid = '';
10              expid = ApexPages.currentPage( ).getParmeters( ).get('expid');
11              Return expid;
12          }
13          ...
14      }
```

In the custom login controller, one embodiment also includes the setExperienceId method of the System. Site class to store the expid value in the user's browser. When stored, it can be retrieved at any time during the lifetime of the user's session:

```
1       Global CustomLoginController( )
2       {
3           ...
4           Expid = getExpidFromURL( );
5           site.SetExperienceId(expId);
6           ...
7       }
```

The various logic and steps set forth in the above description with reference to FIG. 2 are further detailed below, with reference to FIGS. 3C and 3D, according to the embodiment that provides one of a plurality of login experiences for the user based on conditions determined at run time.

Figure 3C:
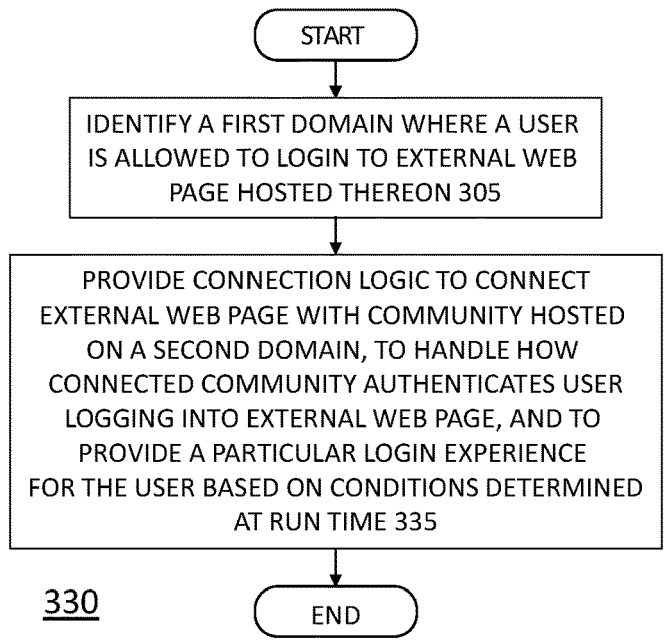
FIG. 3C depicts a flow diagram illustrating a method for implementing authentication of a user login to an external website from a community, including providing one of a plurality of login experiences for the user based on conditions determined at run time, in a cloud based computing environment in accordance with disclosed embodiments.
Figure 3D:
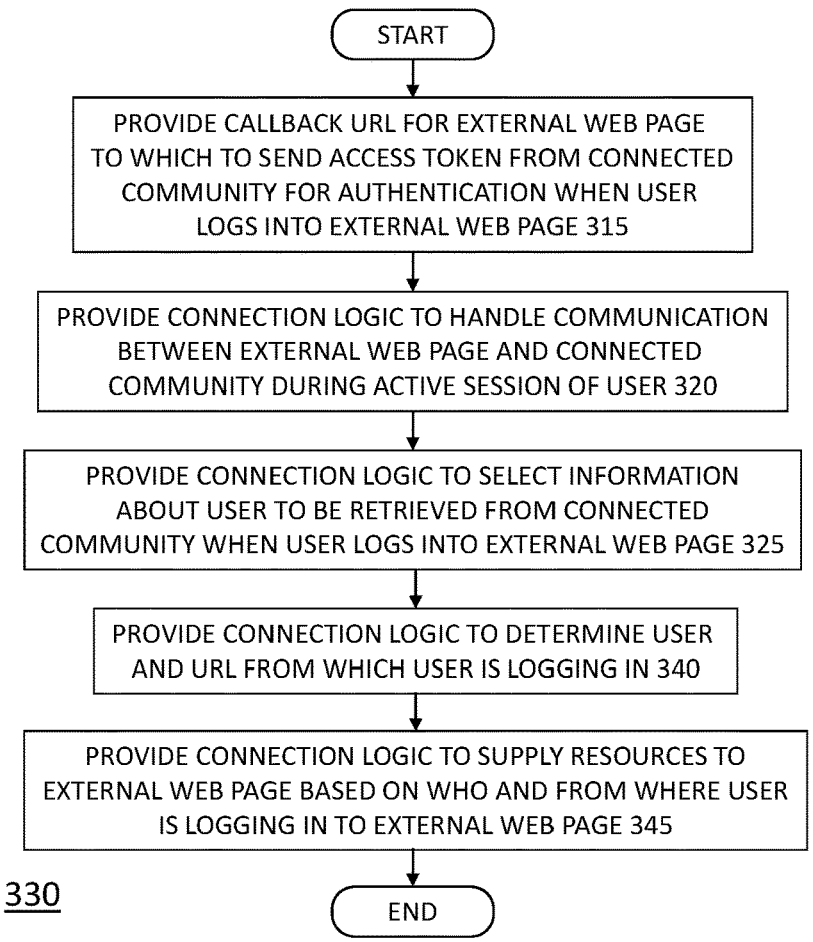
FIG. 3D depicts a flow diagram illustrating a method for implementing authentication of a user login to an external website from a community, including providing one of a plurality of login experiences for the user based on conditions determined at run time, in a cloud based computing environment in accordance with disclosed embodiments.

With reference to the method 330 depicted at FIGS. 3C and 3D, at block 305, processing logic receives user input that identifies one or more domains where users are allowed to login to external web pages hosted at those domains.

According to the embodiment, in order to enable a website to share resources beyond its boundaries, the cloud based computing environment service provider's administrator adds trusted website domains to the CORS (Cross-Origin-Resource-Sharing) whitelist.

At logic block 335, embodiments provide connection logic, separate from the external web page, to connect the external web page with a community of a cloud computing environment hosted on a second domain (listed in CORS) different than the domain for the community. The connection logic handles how the connected community authenticates a user when the user logs into the external web page, and, in this embodiment, provides one of a plurality of login experiences for the user based on conditions determined at run time. The community admin creates a connected application (connection logic 240) to connect the community with a website. The connected application handles communication between the web page and the cloud based computing environment back end.

The connected application controls how the initial authentication process is handled, and determines at run time what login experience the user is provided when the user logs in to the external web page. Then it continues to handle the interaction between the website and community during the user's active session. When creating the connected application, the admin creates callback URLs for both the connected application and the website, which are used to retrieve an access token during the initial authentication process, as previously discussed with reference to FIGS. 3A and 3B.

At logic block 315, the connection logic that handles how the connected community authenticates the user when the user logs into the external web page provides a callback Uniform Resource Locator (URL) string for the external web page that is used to retrieve an access token from the connected community during authentication of the user when the user logs into the external web page.

At logic block 320, the connection logic that handles how the connected community authenticates the user when the user logs into the external web page includes connection logic that handles communication between the external web page and the connected community during an active session of the user that is established once the user is authenticated and logged in to the web page.

At logic block 325, the connection logic that handles how the connected community authenticates the user when the user logs into the external web page includes logic to select information about the user to be retrieved from the connected community when the user logs into the external web page.

At logic block 340 the connection logic that selects and provides one of a number of login experiences for the user based on conditions determined at run time, determines, when the user is logging in to the external web page, who is the user (e.g., an internal employee or an external customer or partner), and from where is the user logging in (e.g., the URL for the external web page to which the user is logging in.

At logic block 345 the connection logic provides various resources associated with a selected login experience when the user is logging into the external web page based on the determination by logic block 340. In one embodiment, providing the resources for a selected login experience when the user is logging into the external web page based on the determination by logic block 340 involves selecting and providing the login experience, and associated resources, when the user is logging into the external web page based on an experience identifier query parameter value contained in the URL from where the user is logging in. In one embodiment, providing the resources includes displaying on the external web page the user is logging into a selected one or more of: one of a plurality of logo images, one of a plurality of background colors, one of a plurality of HTML Inline Frame elements, and one or more secondary web pages.

Figure 5:
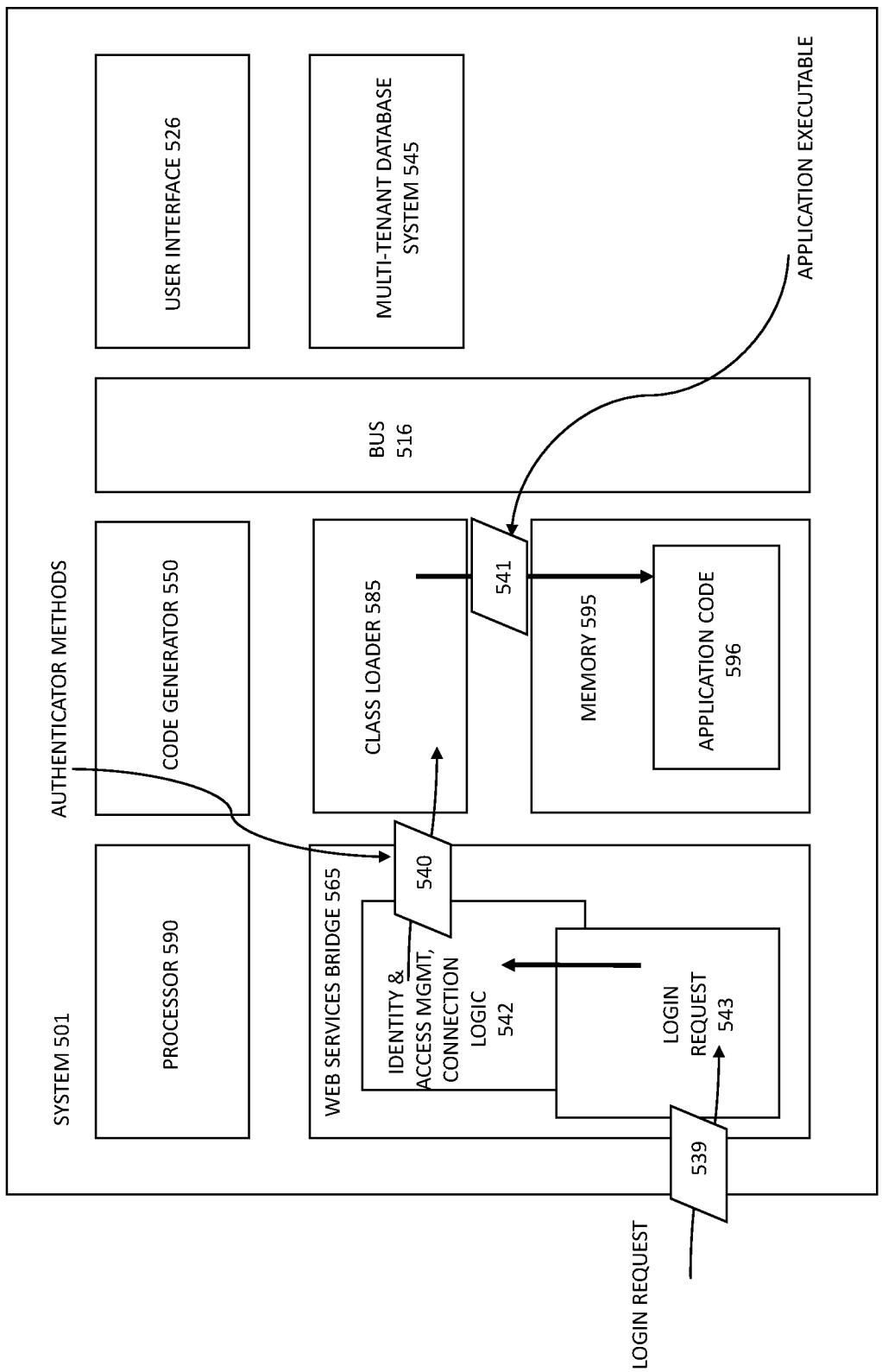
FIG. 5 shows a diagrammatic representation of a system within which embodiments may operate, be installed, integrated, or configured.

FIG. 5 shows a diagrammatic representation of a system 501 within which embodiments may operate, be installed, integrated, or configured. In accordance with one embodiment, there is a system 501 having at least a processor 590 and a memory 595 therein to execute implementing application code 596. Such a system 501 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 501, which may operate within a host organization, includes the processor 590 and the memory 595 to execute instructions at the system 501. According to such an embodiment, the system 501 further includes software instructions that, when executed by the processor, cause the system to identify a first domain where a user is to be allowed to login to an external web page hosted thereon, and connect the external web page with a community of a cloud computing environment hosted on a second domain different than the identified first domain, the software instructions handling how the connected community authenticates the user when the user logs into the external web page and providing one of a plurality of login experiences for the user based on conditions determined at run time.

According to another embodiment of the system 501, a user interface 526 operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives inputs from the client device to design the application as a request for services from the cloud based service provider.

Bus 516 interfaces the various components of the system 501 amongst each other, with any other peripheral(s) of the system 501, and with external components such as external network elements, other machines, client devices, cloud computing services, etc. Communications may further include communicating with external devices via a network interface over a LAN, WAN, or the public Internet.

FIG. 6A illustrates a block diagram of an environment 698 in which an on-demand database service may operate in accordance with the described embodiments. Environment 698 may include user systems 612, network 614, system 616, processor system 617, application platform 618, network interface 620, tenant data storage 622, system data storage 624, program code 626, and process space 628. In other embodiments, environment 698 may not have all of the components listed and/or may have other elements instead of, or in addition to, those listed above.

Figure 6B:
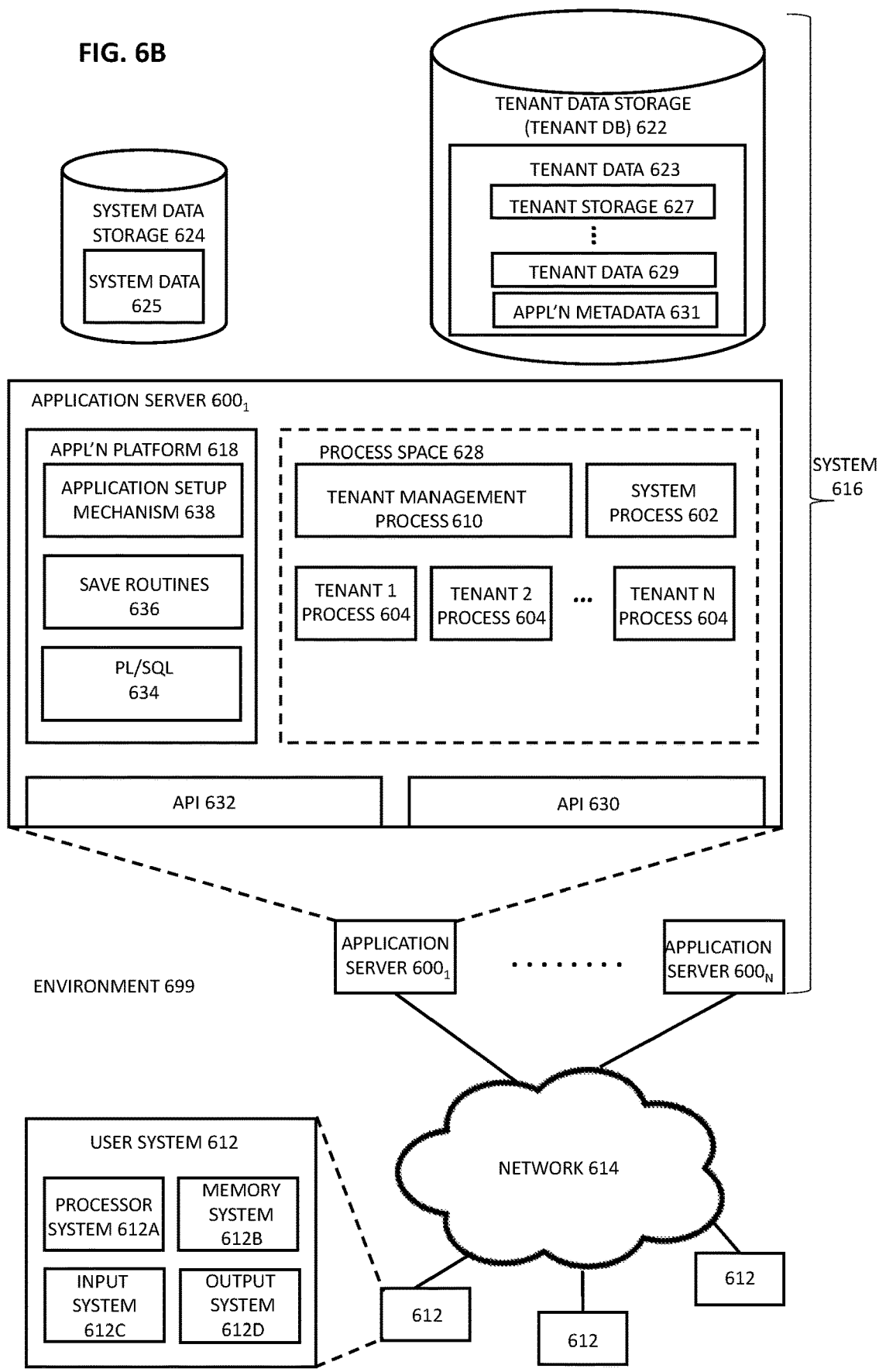
FIG. 6B illustrates another block diagram of an embodiment of elements of FIG. 6A and various possible interconnections between such elements in accordance with the described embodiments.

Environment 698 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6A (and in more detail in FIG. 6B) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6A, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6A, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6A include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6B illustrates another block diagram of an embodiment of elements of FIG. 6A and various possible interconnections between such elements in accordance with the described embodiments. FIG. 6B also illustrates environment 699. However, in FIG. 6B, the elements of system 616 and various interconnections in an embodiment are illustrated in further detail. More particularly, FIG. 6B shows that user system 612 may include a processor system 612A, memory system 612B, input system 612C, and output system 612D. FIG. 6B shows network 614 and system 616. FIG. 6B also shows that system 616 may include tenant data storage 622, having therein tenant data 623, which includes, for example, tenant storage space 627, tenant data 629, and application metadata 631. System data storage 624 is depicted as having therein system data 625. Further depicted within the expanded detail of application servers $600_{1-N}$ are User Interface (UI) 630, Application Program Interface (API) 632, application platform 618 includes PL/SOQL 634, save routines 636, application setup mechanism 638, process space 628 includes system process space 602, tenant 1-N process spaces 604, and tenant management process space 610. In other embodiments, environment 699 may not have the same elements as those listed above and/or may have other elements instead of, or in addition to, those listed above.

User system 612, network 614, system 616, tenant data storage 622, and system data storage 624 were discussed above in FIG. 6A. As shown by FIG. 6B, system 616 may include a network interface 620 (of FIG. 6A) implemented as a set of HTTP application servers 600, an application platform 618, tenant data storage 622, and system data storage 624. Also shown is system process space 602, including individual tenant process spaces 604 and a tenant management process space 610. Each application server 600 may be configured to tenant data storage 622 and the tenant data 623 therein, and system data storage 624 and the system data 625 therein to serve requests of user systems 612. The tenant data 623 might be divided into individual tenant storage areas (e.g., tenant storage space 627), which can be either a physical arrangement and/or a logical arrangement of data. Within each tenant storage space 627, tenant data 629, and application metadata 631 might be similarly allocated for each user. For example, a copy of a user's most recently used (MRU) items might be stored to tenant data 629. Similarly, a copy of MRU items for an entire organization that is a tenant might be stored to tenant storage space 627. A UI 630 provides a user interface and an API 632 provides an application programmer interface into system 616 resident processes to users and/or developers at user systems 612. The tenant data and the system data may be stored in various databases, such as one or more Oracle™ databases.

Application platform 618 includes an application setup mechanism 638 that supports application developers' creation and management of applications, which may be saved as metadata into tenant data storage 622 by save routines 636 for execution by subscribers as one or more tenant process spaces 604 managed by tenant management process space 610 for example. Invocations to such applications may be coded using PL/SOQL 634 that provides a programming language style interface extension to API 632. Invocations to applications may be detected by one or more system processes, which manages retrieving application metadata 631 for the subscriber making the invocation and executing the metadata as an application in a virtual machine.

Each application server 600 may be communicably coupled to database systems, e.g., having access to system data 625 and tenant data 623, via a different network connection. For example, one application server $600_1$ might be coupled via the network 614 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 612 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user may hit three different application servers 600, and three requests from different users may hit the same application server 600. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 600 to request and update system-level and tenant-level data from system 616 that may require sending one or more queries to tenant data storage 622 and/or system data storage 624. System 616 (e.g., an application server 600 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7 illustrates a diagrammatic representation of a machine 700 in the exemplary form of a computer system, in accordance with one embodiment, within which a set of instructions, for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Main memory 704 includes a web services bridge 724, connection logic 725 and a parser 723 by which to communicate with another web services platform, retrieve, and parse a schema to identify methods provided by the web service at the other web services platform in accordance with described embodiments. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display, etc.), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium or a non-transitory computer readable storage medium or a non-transitory machine-accessible storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method for authenticating a user logging into a web page, performed by a system having at least a processor and a memory therein, the method comprising:
   identifying a first domain allowing a user to login to an external web page hosted thereon; and
   providing connection application logic, remote from the external web page, in bi-directional communication with the external web page, to connect the external web page with a community of a cloud computing environment hosted on a second domain different than the identified first domain, the connection application logic:
  handling how the connected community authenticates the user when the user is authenticated to log into the external web page;
  uniquely identifying the connection application logic with the cloud computing environment using an associated consumer unique identifier key;
  having distinct callback Uniform Resource Locator (URL) strings for both the external web page and the connection logic, wherein the callback URL strings are executed pursuant to a community admin command for authentication response, wherein the callback URL strings bi-directionally communicate with both the external web page and the connection application logic, wherein the callback URL strings allows for a temporary placeholder to be updated with a replacement web address,
  retrieving an access token using the callback URL strings from the connected community during authentication of the user when the user logs into the external web page, based on updating the temporary placeholder with the replacement web address;
  authenticating the user with the access token retrieved from the connected community using the callback URL strings; and
  providing one of a plurality of login experiences for the user based on conditions determined at run time.

2. The method of claim 1, wherein the system implements a cloud computing platform to provide on-demand cloud based computing services to subscribers of the cloud computing platform; and
  wherein the cloud computing platform is associated with one of a plurality of customer organizations having subscriber access to the on-demand cloud based computing services provided by the cloud computing platform.

3. The method of claim 1, wherein the connection application logic handling how the connected community authenticates the user when the user is authenticated to log into the external web page includes the connection application logic handling communication between the external web page and the connected community during an active session of the user that is established once the user is authenticated and logged in to the web page.

4. The method of claim 1, wherein the connection application logic handling how the connected community authenticates the user when the user is authenticated to log into the external web page includes the connection application logic selecting information about the user to be retrieved from the connected community when the user logs into the external web page.

5. The method of claim 1, further comprising adding to a markup language for the external web page a plurality of statements to invoke login logic hosted by the connected community to allow the user to login to the web page.

6. The method of claim 5, further comprising adding to the markup language for the external web page a plurality of statements to display a login form on the web page.

7. The method of claim 1, further comprising adding a function to a markup language for the external web page that determines what happens when the user logs into the web page.

8. The method of claim 1, further comprising adding to a markup language for the external web page a callback Uniform Resource Locator (URL) string for the external web page to which the connection application logic provides an authentication response from the connected community when the user is authenticated to log into the external web page.

9. The method of claim 1, wherein providing one of the plurality of login experiences for the user based on conditions determined at run time, comprises:
  determining, when the user is logging in to the external web page, one or more of:
    who is the user, and
    from where is the user logging in; and
  providing one of the plurality of login experiences when the user is logging into the external web page based on the determination.

10. The method of claim 9, wherein determining, when the user is logging in to the external web page, one or more of who is the user, and from where is the user logging in, comprises determining, when the user is logging in to the external web page, whether the user is an internal employee, an external customer or partner, and a URL from where the user is logging in.

11. The method of claim 10, wherein providing one of the plurality of login experiences when the user is logging into the external web page based on the determination comprises providing one of the plurality of login experiences when the user is logging into the external web page based on an experience identifier query parameter value contained in the URL from where the user is logging in.

12. The method of claim 1, wherein providing one of the plurality of login experiences for the user based on conditions determined at run time comprises displaying on the external web page the user is logging into one or more of: one of a plurality of logo images, one of a plurality of background colors, one of a plurality of HTML Inline Frame elements, and one or more secondary web pages.

13. A system to execute within a host organization, wherein the system comprises:
  a memory to store software instructions;
  a set of one or more processors;
  a non-transitory machine-readable storage medium that provides software instructions that, when executed by the set of one or more processors, the software instructions stored in the memory are configurable to cause the system to perform operations comprising:
  identifying a first domain allowing a user to login to an external web page hosted thereon; and
  providing connection application logic, remote from the external web page, in bi-directional communication with the external web page, to connect the external web page with a community of a cloud computing environment hosted on a second domain different than the identified first domain, the connection application logic:
    handling how the connected community authenticates the user when the user is authenticated to log into the external web page;
    uniquely identifying the connection application logic with the cloud computing environment using an associated consumer unique identifier key;
    having distinct callback Uniform Resource Locator (URL) strings for both the external web page and the connection logic, wherein the callback URL strings are executed pursuant to a community admin command for authentication response, wherein the callback URL strings bi-directionally communicate with both the external web page and the connection application logic, wherein the callback URL strings allows for a temporary placeholder to be updated with a replacement web address, retrieving an access token using the callback URL strings from the connected community during authentication of the user when the user logs into the external web page, based on updating the temporary placeholder with the replacement web address;

authenticating the user with the access token retrieved from the connected community using the callback URL strings; and providing one of a plurality of login experiences for the user based on conditions determined at run time.

14. The system of claim 13, wherein the system implements a cloud computing platform to provide on-demand cloud based computing services to subscribers of the cloud computing platform; and
wherein the cloud computing platform is associated with one of a plurality of customer organizations having subscriber access to the on-demand cloud based computing services provided by the cloud computing platform.

15. The system of claim 13, wherein the software instructions handling how the connected community authenticates the user when the user is authenticated to log into the external web page include software instructions handling communication between the external web page and the connected community during an active session of the user that is established once the user is authenticated and logged in to the web page.

16. The system of claim 13, wherein the software instructions handling how the connected community authenticates the user when the user logs into the external web page include software instructions selecting information about the user to be retrieved from the connected community when the user logs into the external web page.

17. The system of claim 13, further comprising markup language for the external web page including a plurality of statements to invoke login logic hosted by the connected community to allow the user to login to the web page.

18. The system of claim 17, further comprising the markup language for the external web page including a plurality of statements to display a login form on the web page.

19. The system of claim 13, further comprising markup language for the external web page including a function that determines what happens when the user logs into the web page.

20. The system of claim 13, further comprising a callback Uniform Resource Locator (URL) string for the external web page included in a markup language for the external web page to which the connection application logic provides an authentication response from the connected community when the user logs into the external web page.

21. The system of claim 13, wherein the software instructions for providing one of the plurality of login experiences for the user based on conditions determined at run time, comprises software instructions for:
determining, when the user is logging in to the external web page, one or more of:
who is the user, and
from where is the user logging in; and
providing one of the plurality of login experiences when the user is logging into the external web page based on the determination.

22. The system of claim 13, wherein the software instructions for determining, when the user is logging in to the external web page, one or more of who is the user, and from where is the user logging in, comprises software instructions for determining, when the user is logging in to the external web page, whether the user is an internal employee, an external customer or partner, and a URL from where the user is logging in.

23. The system of claim 22, wherein the software instructions for providing one of the plurality of login experiences when the user is logging into the external web page based on the determination comprises software instructions for providing one of the plurality of login experiences when the user is logging into the external web page based on an experience identifier query parameter value contained in the URL from where the user is logging in.

24. The system of claim 13, wherein the software instructions for providing one of the plurality of login experiences for the user based on conditions determined at run time comprises software instructions for displaying on the external web page the user is logging into one or more of: one of a plurality of logo images, one of a plurality of background colors, one of a plurality of HTML Inline Frame elements, and one or more secondary web pages.

25. Non-transitory computer readable storage media having instructions stored thereon that, when executed by a processor of a system, the instructions cause the system to perform operations including:
identifying a first domain allowing a user to login to an external web page hosted thereon; and
providing connection application logic, remote from the external web page, in bi-directional communication with the external web page, to connect the external web page with a community of a cloud computing environment hosted on a second domain different than the identified first domain, the connection application logic:
handling how the connected community authenticates the user when the user is authenticated to log into the external web page;
uniquely identifying the connection application logic with the cloud computing environment using an associated consumer unique identifier key;
having distinct callback Uniform Resource Locator (URL) strings for both the external web page and the connection logic, wherein the callback URL strings are executed pursuant to a community admin command for authentication response, wherein the callback URL strings bi-directionally communicate with both the external web page and the connection application logic, wherein the callback URL strings allows for a temporary placeholder to be updated with a replacement web address,
retrieving an access token using the callback URL strings from the connected community during authentication of the user when the user logs into the external web page, based on updating the temporary placeholder with the replacement web address;
authenticating the user with the access token retrieved from the connected community using the callback URL strings; and
providing one of a plurality of login experiences for the user based on conditions determined at run time.

26. The non-transitory computer readable storage media of claim 25, wherein the system implements a cloud computing platform to provide on-demand cloud based computing services to subscribers of the cloud computing platform; and
wherein the cloud computing platform is associated with one of a plurality of customer organizations having subscriber access to the on-demand cloud based computing services provided by the cloud computing platform.

27. The non-transitory computer readable storage media of claim 25, wherein the instructions for handling how the connected community authenticates the user when the user is authenticated to log into the external web page include instructions for handling communication between the external web page and the connected community during an active session of the user that is established once the user is authenticated and logged in to the web page.

28. The non-transitory computer readable storage media of claim 25, wherein the for instructions handling how the connected community authenticates the user when the user is authenticated to log into the external web page include instructions for selecting information about the user to be retrieved from the connected community when the user logs into the external web page.

29. The non-transitory computer readable storage media of claim 25, further comprising markup language for the external web page including a plurality of statements to invoke login logic hosted by the connected community to allow the user to login to the web page.

30. The non-transitory computer readable storage media of claim 29, further comprising markup language for the external web page including a plurality of statements to display a login form on the web page.

31. The non-transitory computer readable storage media of claim 25, further comprising a markup language for the external web page that includes a function to determine what happens when the user logs into the web page.

32. The non-transitory computer readable storage media of claim 25, further comprising a markup language for the external web page including a callback Uniform Resource Locator (URL) string for the external web page to which the connection logic provides an authentication response from the connected community when the user logs into the external web page.

33. The non-transitory computer readable storage media of claim 25, wherein the instructions for providing one of the plurality of login experiences for the user based on conditions determined at run time, comprises instructions for:
   determining, when the user is logging in to the external web page, one or more of:
     who is the user, and
     from where is the user logging in; and
   providing one of the plurality of login experiences when the user is logging into the external web page based on the determination.

34. The non-transitory computer readable storage media of claim 33, wherein the instructions for determining, when the user is logging in to the external web page, one or more of who is the user, and from where is the user logging in, comprises instructions for determining, when the user is logging in to the external web page, whether the user is an internal employee, an external customer or partner, and a URL from where the user is logging in.

35. The non-transitory computer readable storage media of claim 34, wherein the instructions for providing one of the plurality of login experiences when the user is logging into the external web page based on the determination comprises instructions for providing one of the plurality of login experiences when the user is logging into the external web page based on an experience identifier query parameter value contained in the URL from where the user is logging in.

36. The non-transitory computer readable storage media of claim 25, wherein the instructions for providing one of the plurality of login experiences for the user based on conditions determined at run time comprises instructions for displaying on the external web page the user is logging into one or more of: one of a plurality of logo images, one of a plurality of background colors, one of a plurality of HTML Inline Frame elements, and one or more secondary web pages.

* * * * *